(12) United States Patent
Eyuboglu et al.

(10) Patent No.: US 7,835,698 B2
(45) Date of Patent: Nov. 16, 2010

(54) INTERFERENCE MITIGATION IN WIRELESS NETWORKS

(75) Inventors: Vedat Eyuboglu, Concord, MA (US); Pierre A. Humblet, Cambridge, MA (US)

(73) Assignee: Airvana, Corp., Chelmsford, MA (US)

( * ) Notice: Subject to any disclaimer, the term of this patent is extended or adjusted under 35 U.S.C. 154(b) by 556 days.

(21) Appl. No.: 11/967,925

(22) Filed: Dec. 31, 2007

(65) Prior Publication Data

US 2009/0170440 A1 Jul. 2, 2009

(51) Int. Cl.
*H04B 15/00* (2006.01)

(52) U.S. Cl. .................. 455/63.1; 455/67.13; 455/450; 455/452.1; 455/41.2; 455/434; 455/448; 455/502; 370/329; 370/342; 370/437; 370/445; 370/332; 375/346; 375/132

(58) Field of Classification Search ............... 455/63.1, 455/67.13, 450, 452.1, 502, 41.2, 434, 448
See application file for complete search history.

(56) References Cited

U.S. PATENT DOCUMENTS

| | | | | |
|---|---|---|---|---|
| 4,833,693 | A * | 5/1989 | Eyuboglu | .................... 375/254 |
| 5,675,629 | A * | 10/1997 | Raffel et al. | .............. 455/552.1 |
| 6,009,332 | A | 12/1999 | Haartsen | |
| 6,351,643 | B1 * | 2/2002 | Haartsen | ..................... 455/450 |
| 6,405,048 | B1 * | 6/2002 | Haartsen | ..................... 455/464 |
| 6,574,456 | B2 * | 6/2003 | Hamabe | ..................... 455/63.3 |
| 6,650,872 | B1 * | 11/2003 | Karlsson | .................. 455/67.11 |
| 6,711,144 | B1 | 3/2004 | Kim et al. | |
| 6,731,618 | B1 | 5/2004 | Chung et al. | |
| 6,741,862 | B2 | 5/2004 | Chung et al. | |
| 6,781,999 | B2 | 8/2004 | Eyuboglu et al. | |
| 6,941,110 | B2 * | 9/2005 | Kloper et al. | ............ 455/67.11 |
| 7,170,871 | B2 * | 1/2007 | Eyuboglu et al. | ........... 370/331 |
| 7,200,391 | B2 | 4/2007 | Chung et al. | |
| 7,224,697 | B2 * | 5/2007 | Banerjea et al. | ............. 370/401 |
| 7,242,958 | B2 | 7/2007 | Chung et al. | |

(Continued)

FOREIGN PATENT DOCUMENTS

EP 1257137 11/2002

(Continued)

OTHER PUBLICATIONS

U.S. Appl. No. 11/935,975, filed Nov. 6, 2007, Samar et al., Pending.

(Continued)

*Primary Examiner*—Marceau Milord
(74) *Attorney, Agent, or Firm*—Fish & Richardson P.C.

(57) ABSTRACT

A method of mitigating interference between a private access point and an access terminal in a radio access network, where the private access point uses a shared carrier frequency that is shared with a macro access point, and where the access terminal has an idle operational state and an active operational state, includes directing the access terminal to move to a first carrier frequency other than the shared carrier frequency if the access terminal operates on the shared carrier frequency in the active operational state. The access terminal is configured to communicate with the macro access point and the access terminal is not authorized to communicate with the private access point. N carrier frequencies are used by the macro access point, where $N \geq 2$.

136 Claims, 10 Drawing Sheets

U.S. PATENT DOCUMENTS

| | | | |
|---|---|---|---|
| 7,277,446 | B1 | 10/2007 | Abi-Nassif et al. |
| 7,299,278 | B2 | 11/2007 | Ch'ng |
| 7,349,503 | B2 * | 3/2008 | Husted et al. ............... 375/346 |
| 7,408,907 | B2 * | 8/2008 | Diener ........................ 370/338 |
| 7,440,728 | B2 * | 10/2008 | Abhishek et al. ............ 455/41.2 |
| 7,463,592 | B2 * | 12/2008 | Poncini et al. ............... 370/252 |
| 2002/0196749 | A1 | 12/2002 | Eyuboglu et al. |
| 2003/0100311 | A1 | 5/2003 | Chung et al. |
| 2004/0038697 | A1 | 2/2004 | Attar et al. |
| 2005/0213555 | A1 | 9/2005 | Eyuboglu et al. |
| 2005/0243749 | A1 | 11/2005 | Mehrabanzad et al. |
| 2005/0245279 | A1 | 11/2005 | Mehrabanzad et al. |
| 2006/0067422 | A1 | 3/2006 | Chung |
| 2006/0067451 | A1 | 3/2006 | Pollman et al. |
| 2006/0126509 | A1 | 6/2006 | Abi-Nassif |
| 2006/0159045 | A1 | 7/2006 | Ananthaiyer et al. |
| 2006/0240782 | A1 | 10/2006 | Pollman et al. |
| 2006/0291420 | A1 | 12/2006 | Ng |
| 2006/0294241 | A1 | 12/2006 | Cherian et al. |
| 2007/0026884 | A1 | 2/2007 | Rao |
| 2007/0058628 | A1 | 3/2007 | Rao et al. |
| 2007/0077948 | A1 | 4/2007 | Sharma et al. |
| 2007/0097916 | A1 | 5/2007 | Eyuboglu et al. |
| 2007/0115896 | A1 | 5/2007 | To et al. |
| 2007/0140172 | A1 | 6/2007 | Garg et al. |
| 2007/0140184 | A1 | 6/2007 | Garg et al. |
| 2007/0140185 | A1 | 6/2007 | Garg et al. |
| 2007/0140218 | A1 | 6/2007 | Nair et al. |
| 2007/0155329 | A1 | 7/2007 | Mehrabanzad et al. |
| 2007/0220573 | A1 | 9/2007 | Chiussi et al. |
| 2007/0230419 | A1 | 10/2007 | Raman et al. |
| 2007/0238442 | A1 | 10/2007 | Mate et al. |
| 2007/0238476 | A1 | 10/2007 | Raman et al. |
| 2007/0242648 | A1 | 10/2007 | Garg et al. |
| 2007/0248042 | A1 | 10/2007 | Harikumar et al. |
| 2008/0003988 | A1 | 1/2008 | Richardson |
| 2008/0013488 | A1 | 1/2008 | Garg et al. |
| 2008/0062925 | A1 | 3/2008 | Mate et al. |
| 2008/0065752 | A1 | 3/2008 | Ch'ng et al. |
| 2008/0069020 | A1 | 3/2008 | Richardson |
| 2008/0069028 | A1 | 3/2008 | Richardson |
| 2008/0076398 | A1 | 3/2008 | Mate et al. |
| 2008/0117842 | A1 | 5/2008 | Rao |
| 2008/0119172 | A1 | 5/2008 | Rao et al. |
| 2008/0120417 | A1 | 5/2008 | Harikumar et al. |
| 2008/0139203 | A1 | 6/2008 | Ng et al. |
| 2008/0146232 | A1 | 6/2008 | Knisely |
| 2008/0151843 | A1 | 6/2008 | Valmikam et al. |
| 2008/0159236 | A1 | 7/2008 | Ch'ng et al. |
| 2008/0162924 | A1 | 7/2008 | Chinitz et al. |
| 2008/0162926 | A1 | 7/2008 | Xiong et al. |
| 2008/0253550 | A1 | 10/2008 | Ch'ng et al. |
| 2008/0254792 | A1 | 10/2008 | Ch'ng |
| 2009/0034440 | A1 | 2/2009 | Samar et al. |
| 2009/0082020 | A1 | 3/2009 | Ch'ng et al. |
| 2009/0088155 | A1 | 4/2009 | Kim |
| 2009/0170440 | A1 | 7/2009 | Eyuboglu et al. |

FOREIGN PATENT DOCUMENTS

| | | |
|---|---|---|
| GB | 2452688 | 3/2009 |
| WO | WO 2009/088677 | 7/2009 |

OTHER PUBLICATIONS

U.S. Appl. No. 11/967,370, filed Dec. 31, 2007, Den et al., Pending.
U.S. Appl. No. 11/968,090, filed Dec. 31, 2007, Jones, Pending.
U.S. Appl. No. 11/962,983, filed Dec. 21, 2007, Raghothaman, Pending.
U.S. Appl. No. 11/966,516, filed Dec. 28, 2007, Eyuboglu et al., Pending.
U.S. Appl. No. 11/958,975, filed Dec. 18, 2007, Humblet et al., Pending.
U.S. Appl. No. 11/960,026, filed Dec. 19, 2007, Hoang et al., Pending.
U.S. Appl. No. 11/966,195, filed Dec. 28, 2007, Ch'ng et al., Pending.
U.S. Appl. No. 11/962,734, file Dec. 21, 2007, Humblet et al., Pending.
U.S. Appl. No. 11/955,644, filed Dec. 13, 2007, Garg et al., Pending.
U.S. Appl. No. 11/958,934, filed Dec. 18, 2007, Raghothaman et al., Pending.
U.S. Appl. No. 11/968,088, filed Dec. 31, 2007, Kim, Pending.
U.S. Appl. No. 11/963,574, filed Dec. 21, 2007, Rao et al., Pending.
U.S. Appl. No. 11/965,070, filed Dec. 27, 2007, Raghothaman et al., Pending.
U.S. Appl. No. 11/960,100, filed Dec. 19, 2007, Humblet et al., Pending.
U.S. Appl. No. 11/966,535, filed Dec. 28, 2007, Ch'ng et al., Pending.
U.S. Appl. No. 11/967,925, filed Dec. 31, 2007, Eyuboglu et al., Pending.
U.S. Appl. No. 12/236,420, filed Sep. 23, 2008, Jones, Pending.
U.S. Appl. No. 12/201,380, filed Aug. 29, 2008, Humblet et al., Pending.
U.S. Appl. No. 12/246,861, filed Oct. 7, 2008, Humblet, Pending.
U.S. Appl. No. 12/343,850, filed Dec. 24, 2008, Humblet, Pending.
U.S. Appl. No. 12/345,472, filed Dec. 29, 2008, Hegde et al., Pending.
U.S. Appl. No. 12/347,574, filed Dec. 31, 2008, Andrew Richardson, Pending.
U.S. Appl. No. 12/343,438, file Dec. 23, 2008, Raghothaman et al., Pending.
U.S. Appl. No. 12/347,511, filed Dec. 31, 2008, Sundaram M. Rajagopalan et al., Pending.
U.S. Appl. No. 12/346,464, filed Dec. 30, 2008, Raghothaman et al., Pending.
U.S. Appl. No. 12/346,272, filed Dec. 30, 2008, Raghothaman et al., Pending.
U.S. Appl. No. 12/343,445, filed Dec. 23, 2008, Anderlind et al., Pending.
U.S. Appl. No. 12/347,201, filed Dec. 31, 2008, Chiussi et al., Pending.
U.S. Appl. No. 12/347,234, filed Dec. 31, 2008, Fabio Chiussi et al., Pending.
U.S. Appl. No. 12/350,156, filed Jan. 7, 2009, Balaji Raghothaman et al., Pending.
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-A, version 2, Jul. 2005 (1227 pages).
3rd Generation Partnership Project 2 "3GPP2", "cdma2000 High Rate Packet Data Interface Specification", C.S0024-B, version 1, Apr. 2006 (1623 pages).
3rd Generation Partnership Project 2 "3GPP2", "cdma2000 High Rate Packet Data Interface Specification", C.S0024-B, version 2, Mar. 2007 (1627 pages).
3rd Generation Partnership Project 2 "3GPP2", "cdma2000 High Rate Packet Data Interface Specification", C.S0024, version 4, Oct. 25, 2002 (548 pages).
International Search Report and Written Opinion from corresponding PCT application No. PCT/US2008/087086, mailed Apr. 21, 2009 (17 pages).
International Preliminary Report on Patentability from corresponding PCT application No. PCT/US2008/087086, mailed Jul. 15, 2010 (10 pages).

* cited by examiner

INTERFERENCE MITIGATION IN WIRELESS NETWORKS

BACKGROUND

This disclosure relates to interference mitigation in wireless networks.

When connecting to a radio network, an access terminal selects an access point from available radio network access points that are found to be within communication range. Network protocols are used in communicating between an access point and an access terminal.

The 1xRTT protocol has been standardized by the Telecommunication Industry Association (TIA) in the TIA-2000.1 through TIA-2000.6 series of specifications, which are incorporated herein by reference.

The 1xEV-DO protocol has been standardized by the TIA as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-8560B, 3GPP2 C.S0024-B, version 1.0, May 2006, and is also incorporated herein by reference. Other wireless communication protocols, such as UMTS (Universal Mobile Telecommunications Service), may also be used.

SUMMARY

In general, in some aspects, a method of mitigating interference between a private access point and an access terminal in a radio access network, where the private access point uses a shared carrier frequency that is shared with a macro access point, and where the access terminal has an idle operational state and an active operational state, includes directing the access terminal to move to a first carrier frequency other than the shared carrier frequency if the access terminal operates on the shared carrier frequency in the active operational state. The access terminal is configured to communicate with the macro access point and the access terminal is not authorized to communicate with the private access point. N carrier frequencies are used by the macro access point, where $N \geq 2$.

Implementations may include one or more of the following features.

The method may also include configuring a first carrier list for broadcast on a second carrier frequency other than the shared carrier frequency by the macro access point to the access terminal in the idle operational state of the access terminal. The first carrier list may not include the shared carrier frequency. Configuring the first carrier list for broadcast by the macro access point to the access terminal in the idle operational state of the access terminal may include configuring a set of N carrier lists for broadcast by the macro access point. Each particular carrier list of the set of N carrier lists may be broadcast by the macro access point on a corresponding particular different carrier frequency of the N carrier frequencies used by the macro access point. The N carrier frequencies may include the shared carrier frequency and the first carrier frequency. The set of N carrier lists may include the first carrier list and a second carrier list that is broadcast by the macro access point on the shared carrier frequency. The access terminal may be configured to select an idling carrier frequency from a received carrier list of the set of N carrier lists based on an algorithm. The access terminal may receive the received carrier list from the macro access point. The access terminal may be configured to idle on the idling carrier frequency in the idle operational state of the access terminal. All carrier lists of the set of N carrier lists may include no more than N-1 carrier list elements. The N-1 carrier list elements may correspond to certain carrier frequencies of the N carrier frequencies. All carrier lists of the set of N carrier lists may not include the shared carrier frequency as one of the N-1 carrier list elements.

The method may also include configuring a first carrier list for broadcast on a second carrier frequency other than the shared carrier frequency by the macro access point to the access terminal in the idle operational state of the access terminal. Configuring the first carrier list for broadcast by the macro access point to the access terminal in the idle operational state of the access terminal may include configuring a set of N carrier lists for broadcast by the macro access point. Each particular carrier list of the set of N carrier lists may be broadcast by the macro access point on a corresponding particular different carrier frequency of the N carrier frequencies used by the macro access point. The N carrier frequencies may include the shared carrier frequency and the first carrier frequency. The set of N carrier lists may include the first carrier list and a second carrier list that is broadcast by the macro access point on the shared carrier frequency. All carrier lists of the set of N carrier lists may include N carrier list elements. The N carrier list elements may correspond to certain carrier frequencies of the N carrier frequencies. Different carrier lists of the set of N carrier lists may be permitted to have different elements from one another. The second carrier list may include the shared carrier frequency as one of the N carrier list elements. Configuring the set of N carrier lists for broadcast by the macro access point may include removing the shared carrier frequency from the first carrier list and replacing the shared carrier frequency in the first carrier list with the second carrier frequency on which the first carrier list is broadcast by the macro access point, so that the second carrier frequency appears at least two times in the first carrier list. Configuring the set of N carrier lists for broadcast by the macro access point may also include removing the second carrier frequency from a third carrier list of the set of N carrier lists, removing the second carrier frequency from the second carrier list, and replacing the second carrier frequency in the third carrier list and the second carrier list with the shared carrier frequency, so that the shared carrier frequency appears at least two times in the third carrier list and the second carrier list. The private access point may be configured to direct the access terminal to move to the second carrier frequency if the private access point determines that the access terminal is within range of the private access point on the shared carrier frequency in the idle operational state of the access terminal. The private access point may be configured to direct the access terminal to move to the second carrier frequency based on the replacement of the shared carrier frequency in the first carrier list with the second carrier frequency. The method may further include sending a paging message to the access terminal based on a registration message received from the access terminal. The access terminal may be configured to send the registration message to the macro access point in response to the access terminal being directed by the private access point to move to the second carrier frequency. The method may further include sending a paging message to the access terminal on at least the shared carrier frequency and the second carrier frequency of the N carrier frequencies.

In the method, configuring the set of N carrier lists for broadcast by the macro access point may include removing the shared carrier frequency from the first carrier list, and replacing the shared carrier frequency in the first carrier list with the second carrier frequency on which the first carrier list is broadcast by the macro access point, so that the second carrier frequency appears at least two times in the first carrier list. The method may further include configuring a roaming list for a set of access terminals. The set of access terminals may include the access terminal. The method may also include assigning the second carrier frequency a reduced priority in the roaming list so that the set of access terminals is less likely to receive the first carrier list from the macro access point.

The method may also include configuring an additional carrier list for broadcast by the macro access point so that a set of N+1 carrier lists is configured for broadcast by the macro access point. The set of N+1 carrier lists may include the set of N carrier lists. All carrier lists of the set of N+1 carrier lists may include N+1 carrier list elements. A second shared carrier frequency may be an additional frequency used by the macro access point so that N+1 carrier frequencies may be used by the macro access point. The N+1 carrier frequencies may include the N carrier frequencies. The method may also include removing the second shared carrier frequency from the first carrier list. A second private access point and the macro access point both may use the second shared carrier frequency. The method may also include replacing the second shared carrier frequency in the first carrier list with the second carrier frequency on which the first carrier list is broadcast by the macro access point, so that the second carrier frequency appears at least three times in the first carrier list. The method may also include removing the second shared carrier frequency from a third carrier list of the set of N+1 carrier lists. The method may also include replacing the second shared carrier frequency in the third carrier list with a third carrier frequency on which the third carrier list is broadcast by the macro access point, so that the second carrier frequency appears at least two times in the third carrier list.

The method may also include determining whether the access terminal is within range of the private access point in the active operational state of the access terminal. The directing may be performed if the access terminal is determined to be within range of the private access point. The private access point may not use the first carrier frequency. The method may also include receiving one or more reports from the access terminal. The access terminal may be operating on the shared carrier frequency in the active operational state. The directing may be performed based on at least one report of the one or more reports received from the access terminal. The directing may be performed if the at least one report of the one or more reports received from the access terminal indicates that the access terminal is likely to be within range of the private access point. The one or more reports may include a first report sent by the access terminal on the shared carrier frequency. The first report may include measurements of one or more signals received by the access terminal on the shared carrier frequency. The method may further include analyzing the first report. The directing may be performed based on the first report only, without knowledge of signal measurements on carrier frequencies of the N frequencies other than the shared carrier frequency. The first carrier frequency may be known to a macro controller to be a dedicated macro carrier frequency. The private access point may not use the first carrier frequency. The one or more reports may further include additional reports sent by the access terminal. The additional reports may include measurements of one or more signals received by the access terminal on one or more carrier frequencies of the N frequencies other than the shared carrier frequency. The private access point may not use the one or more carrier frequencies. The access terminal may be configured to send the additional reports independently of being requested to do so. The access terminal may be configured to compare measurements of received signals on the shared carrier frequency to one or more thresholds and to send the additional reports based a result of the comparison. The method may also include requesting that the access terminal send the additional reports. Requesting that the access terminal send the additional reports may include analyzing the first report, and requesting that the access terminal send the additional reports responsively to analysis of the first report. Requesting that the access terminal send the additional reports may include periodically requesting that the access terminal send the additional reports.

The method may also include configuring a first carrier list for broadcast on a second carrier frequency other than the shared carrier frequency by the macro access point to the access terminal in the idle operational state of the access terminal. The method may also include, in an idle to active state of the access terminal, allocating a fourth carrier frequency to the access terminal for use by the access terminal in the active operational state of the access terminal. The configuring, the directing, and the allocating may be performed by a macro controller via the macro access point. The configuring, the directing, and the allocating may be performed by the macro access point. The fourth carrier frequency may include one of the shared carrier frequency, the first carrier frequency, or the second carrier frequency. The allocating may include allocating the fourth carrier frequency to the access terminal based on a carrier frequency allocation algorithm. The carrier frequency allocation algorithm may be based on the carrier frequency utilization of a set of access terminals communicating with the macro access point at corresponding carrier frequencies of the N carrier frequencies. The method may also include, if the fourth carrier frequency allocated to the access terminal includes the shared carrier frequency, then, analyzing a report sent by the access terminal on the shared carrier frequency. The report may include measurements of one or more signals received by the access terminal on the shared carrier frequency. The method may also include, if the fourth carrier frequency allocated to the access terminal includes the shared carrier frequency, then, directing the access terminal to move to the first carrier frequency other than the shared carrier frequency if the report indicates that the access terminal is likely to be within range of the private access point. The allocating may include receiving a request for a traffic channel from the access terminal on the shared carrier frequency, and allocating the fourth carrier frequency to the access terminal based on the request. The fourth carrier frequency may include the shared carrier frequency. The allocating may include allocating the fourth carrier frequency to the access terminal according to an idling carrier frequency used by the access terminal in the idle operational state of the access terminal.

The method may also include configuring a first carrier list for broadcast on a second carrier frequency other than the shared carrier frequency by the macro access point to the access terminal in the idle operational state of the access terminal. The method may also include, in an idle to active state of the access terminal, allocating a fourth carrier frequency to the access terminal for use by the access terminal in the active operational state of the access terminal. The method may also include receiving one or more reports from the access terminal. The access terminal may be operating on a fifth carrier frequency other than the shared carrier frequency in the idle operational state. The fifth carrier frequency may be a dedicated macro frequency and the private access point may not use the fifth carrier frequency. The method may also include determining whether to allocate the shared carrier frequency to the access terminal based on at least one report of the one or more reports received from the access terminal. The shared carrier frequency may be allocated to the access terminal if the at least one report of the one or more reports received from the access terminal indicates that the access terminal is unlikely to be within range of the private access point. The one or more reports may include a first report sent by the access terminal on the shared carrier frequency. The first report may include measurements of one or more signals received by the access terminal on the shared carrier frequency. The method may also include requesting that the access terminal send the first report. The one or more reports may include a second report sent by the access terminal on the fifth carrier frequency. The second report may include measurements of one or more signals received by the access terminal on the fifth carrier frequency. The one or more reports may further include additional reports sent by the access terminal. The additional reports may include measurements of one or more signals received by the access terminal on one or more carrier frequencies of the N frequencies other than the shared carrier frequency and the fifth carrier frequency. The private access point may not use the one or more carrier frequencies. The method may also include requesting that the access terminal send the additional reports. Requesting that the access terminal send the additional reports may include analyzing the first report, and requesting that the access terminal send the additional reports responsively to analysis of the first report.

In some aspects, a computer program product is tangibly embodied in one or more information carriers for mitigating interference between a private access point and an access terminal in a radio access network. The private access point uses a shared carrier frequency that is shared with a macro access point. The access terminal has an idle operational state and an active operational state. The computer program product includes instructions that are executable by one or more processing devices to direct the access terminal to move to a first carrier frequency other than the shared carrier frequency if the access terminal operates on the shared carrier frequency in the active operational state. The access terminal is configured to communicate with the macro access point and the access terminal is not authorized to communicate with the private access point. N carrier frequencies are used by the macro access point, where $N \geq 2$.

Implementations may include one or more of the following features.

The computer program product may further include instructions that are executable by the one or more processing devices to configure a first carrier list for broadcast on a second carrier frequency other than the shared carrier frequency by the macro access point to the access terminal in the idle operational state of the access terminal. The first carrier list may not include the shared carrier frequency. Configuring the first carrier list for broadcast by the macro access point to the access terminal in the idle operational state of the access terminal may include configuring a set of N carrier lists for broadcast by the macro access point. Each particular carrier list of the set of N carrier lists may be broadcast by the macro access point on a corresponding particular different carrier frequency of the N carrier frequencies used by the macro access point. The N carrier frequencies may include the shared carrier frequency and the first carrier frequency. The set of N carrier lists may include the first carrier list and a second carrier list that is broadcast by the macro access point on the shared carrier frequency. The access terminal may be configured to select an idling carrier frequency from a received carrier list of the set of N carrier lists based on an algorithm. The access terminal may receive the received carrier list from the macro access point. The access terminal may be configured to idle on the idling carrier frequency in the idle operational state of the access terminal. All carrier lists of the set of N carrier lists may include no more than N−1 carrier list elements. The N−1 carrier list elements may correspond to certain carrier frequencies of the N carrier frequencies. All carrier lists of the set of N carrier lists may not include the shared carrier frequency as one of the N−1 carrier list elements.

The computer program product may further include instructions that are executable by the one or more processing devices to configure a first carrier list for broadcast on a second carrier frequency other than the shared carrier frequency by the macro access point to the access terminal in the idle operational state of the access terminal. Configuring the first carrier list for broadcast by the macro access point to the access terminal in the idle operational state of the access terminal may include configuring a set of N carrier lists for broadcast by the macro access point. Each particular carrier list of the set of N carrier lists may be broadcast by the macro access point on a corresponding particular different carrier frequency of the N carrier frequencies used by the macro access point. The N carrier frequencies may include the shared carrier frequency and the first carrier frequency. The set of N carrier lists may include the first carrier list and a second carrier list that is broadcast by the macro access point on the shared carrier frequency. All carrier lists of the set of N carrier lists may include N carrier list elements. The N carrier list elements may correspond to certain carrier frequencies of the N carrier frequencies. Different carrier lists of the set of N carrier lists may be permitted to have different elements from one another. The second carrier list may include the shared carrier frequency as one of the N carrier list elements. Configuring the set of N carrier lists for broadcast by the macro access point may include removing the shared carrier frequency from the first carrier list and replacing the shared carrier frequency in the first carrier list with the second carrier frequency on which the first carrier list is broadcast by the macro access point, so that the second carrier frequency appears at least two times in the first carrier list. Configuring the set of N carrier lists for broadcast by the macro access point may also include removing the second carrier frequency from a third carrier list of the set of N carrier lists, removing the second carrier frequency from the second carrier list, and replacing the second carrier frequency in the third carrier list and the second carrier list with the shared carrier frequency, so that the shared carrier frequency appears at least two times in the third carrier list and the second carrier list. The private access point may be configured to direct the access terminal to move to the second carrier frequency if the private access point determines that the access terminal is within range of the private access point on the shared carrier frequency in the idle operational state of the access terminal. The private access point may be configured to direct the access terminal to move to the second carrier frequency based on the replacement of the shared carrier frequency in the first carrier list with the second carrier frequency. The computer program product may further include instructions that are executable by the one or more processing devices to send a paging message to the access terminal based on a registration message received from the access terminal. The access terminal may be configured to send the registration message to the macro access point in response to the access terminal being directed by the private access point to move to the second carrier frequency. The computer program product may further include instructions that are executable by the one or more processing devices to send a paging message to the access terminal on at least the shared carrier frequency and the second carrier frequency of the N carrier frequencies.

In the computer program product, configuring the set of N carrier lists for broadcast by the macro access point may include removing the shared carrier frequency from the first carrier list, and replacing the shared carrier frequency in the first carrier list with the second carrier frequency on which the first carrier list is broadcast by the macro access point, so that the second carrier frequency appears at least two times in the first carrier list. The computer program product may further include instructions that are executable by the one or more processing devices to configure a roaming list for a set of access terminals. The set of access terminals may include the access terminal. The computer program product may further include instructions that are executable by the one or more processing devices to assign the second carrier frequency a reduced priority in the roaming list so that the set of access terminals is less likely to receive the first carrier list from the macro access point.

The computer program product may further include instructions that are executable by the one or more processing devices to configure an additional carrier list for broadcast by the macro access point so that a set of N+1 carrier lists is configured for broadcast by the macro access point. The set of N+1 carrier lists may include the set of N carrier lists. All carrier lists of the set of N+1 carrier lists may include N+1 carrier list elements. A second shared carrier frequency may be an additional frequency used by the macro access point so that N+1 carrier frequencies may be used by the macro access point. The N+1 carrier frequencies may include the N carrier frequencies. The computer program product may further include instructions that are executable by the one or more processing devices to remove the second shared carrier frequency from the first carrier list. A second private access point and the macro access point both may use the second shared carrier frequency. The computer program product may further include instructions that are executable by the one or more processing devices to replace the second shared carrier frequency in the first carrier list with the second carrier frequency on which the first carrier list is broadcast by the macro access point, so that the second carrier frequency appears at least three times in the first carrier list. The computer program product may further include instructions that are executable by the one or more processing devices to remove the second shared carrier frequency from a third carrier list of the set of N+1 carrier lists. The computer program product may further include instructions that are executable by the one or more processing devices to replace the second shared carrier frequency in the third carrier list with a third carrier frequency on which the third carrier list is broadcast by the macro access point, so that the second carrier frequency appears at least two times in the third carrier list.

The computer program product may further include instructions that are executable by the one or more processing devices to determine whether the access terminal is within range of the private access point in the active operational state of the access terminal. The directing may be performed if the access terminal is determined to be within range of the private access point. The private access point may not use the first carrier frequency. The computer program product may further include instructions that are executable by the one or more processing devices to receive one or more reports from the access terminal. The access terminal may be operating on the shared carrier frequency in the active operational state.

The directing may be performed based on at least one report of the one or more reports received from the access terminal. The directing may be performed if the at least one report of the one or more reports received from the access terminal indicates that the access terminal is likely to be within range of the private access point. The one or more reports may include a first report sent by the access terminal on the shared carrier frequency. The first report may include measurements of one or more signals received by the access terminal on the shared carrier frequency. The computer program product may further include instructions that are executable by the one or more processing devices to analyze the first report. The directing may be performed based on the first report only, without knowledge of signal measurements on carrier frequencies of the N frequencies other than the shared carrier frequency. The first carrier frequency may be known to a macro controller to be a dedicated macro carrier frequency. The private access point may not use the first carrier frequency. The one or more reports may further include additional reports sent by the access terminal. The additional reports may include measurements of one or more signals received by the access terminal on one or more carrier frequencies of the N frequencies other than the shared carrier frequency. The private access point may not use the one or more carrier frequencies. The access terminal may be configured to send the additional reports independently of being requested to do so. The access terminal may be configured to compare measurements of received signals on the shared carrier frequency to one or more thresholds and to send the additional reports based a result of the comparison. The computer program product may further include instructions that are executable by the one or more processing devices to request that the access terminal send the additional reports. Requesting that the access terminal send the additional reports may include analyzing the first report, and requesting that the access terminal send the additional reports responsively to analysis of the first report. Requesting that the access terminal send the additional reports may include periodically requesting that the access terminal send the additional reports.

The computer program product may further include instructions that are executable by the one or more processing devices to configure a first carrier list for broadcast on a second carrier frequency other than the shared carrier frequency by the macro access point to the access terminal in the idle operational state of the access terminal. The computer program product may further include instructions that are executable by the one or more processing devices to, in an idle to active state of the access terminal, allocate a fourth carrier frequency to the access terminal for use by the access terminal in the active operational state of the access terminal. The configuring, the directing, and the allocating may be performed by a macro controller via the macro access point. The configuring, the directing, and the allocating may be performed by the macro access point. The fourth carrier frequency may include one of the shared carrier frequency, the first carrier frequency, or the second carrier frequency. The allocating may include allocating the fourth carrier frequency to the access terminal based on a carrier frequency allocation algorithm. The carrier frequency allocation algorithm may be based on the carrier frequency utilization of a set of access terminals communicating with the macro access point at corresponding carrier frequencies of the N carrier frequencies. The computer program product may further include instructions that are executable by the one or more processing devices to, if the fourth carrier frequency allocated to the access terminal includes the shared carrier frequency, then, analyze a report sent by the access terminal on the shared carrier frequency. The report may include measurements of one or more signals received by the access terminal on the shared carrier frequency. The computer program product may further include instructions that are executable by the one or more processing devices to if the fourth carrier frequency allocated to the access terminal includes the shared carrier frequency, then, direct the access terminal to move to the first carrier frequency other than the shared carrier frequency if the report indicates that the access terminal is likely to be within range of the private access point. The allocating may include receiving a request for a traffic channel from the access terminal on the shared carrier frequency, and allocating the fourth carrier frequency to the access terminal based on the request. The fourth carrier frequency may include the shared carrier frequency. The allocating may include allocating the fourth carrier frequency to the access terminal according to an idling carrier frequency used by the access terminal in the idle operational state of the access terminal.

The computer program product may further include instructions that are executable by the one or more processing devices to configure a first carrier list for broadcast on a second carrier frequency other than the shared carrier frequency by the macro access point to the access terminal in the idle operational state of the access terminal. The computer program product may further include instructions that are executable by the one or more processing devices to, in an idle to active state of the access terminal, allocate a fourth carrier frequency to the access terminal for use by the access terminal in the active operational state of the access terminal. The computer program product may further include instructions that are executable by the one or more processing devices to receive one or more reports from the access terminal. The access terminal may be operating on a fifth carrier frequency other than the shared carrier frequency in the idle operational state. The fifth carrier frequency may be a dedicated macro frequency and the private access point may not use the fifth carrier frequency. The computer program product may further include instructions that are executable by the one or more processing devices to determine whether to allocate the shared carrier frequency to the access terminal based on at least one report of the one or more reports received from the access terminal. The shared carrier frequency may be allocated to the access terminal if the at least one report of the one or more reports received from the access terminal indicates that the access terminal is unlikely to be within range of the private access point. The one or more reports may include a first report sent by the access terminal on the shared carrier frequency. The first report may include measurements of one or more signals received by the access terminal on the shared carrier frequency. The computer program product may further include instructions that are executable by the one or more processing devices to request that the access terminal send the first report. The one or more reports may include a second report sent by the access terminal on the fifth carrier frequency. The second report may include measurements of one or more signals received by the access terminal on the fifth carrier frequency. The one or more reports may further include additional reports sent by the access terminal. The additional reports may include measurements of one or more signals received by the access terminal on one or more carrier frequencies of the N frequencies other than the shared carrier frequency and the fifth carrier frequency. The private access point may not use the one or more carrier frequencies. The computer program product may further include instructions that are executable by the one or more processing devices to request that the access terminal send the additional reports.

Requesting that the access terminal send the additional reports may include analyzing the first report, and requesting that the access terminal send the additional reports responsively to analysis of the first report.

In some aspects, a system, for mitigating interference between a private access point and an access terminal in a radio access network, includes a macro controller. The private access point uses a shared carrier frequency that is shared with a macro access point. The access terminal has an idle operational state and an active operational state. The macro controller includes memory configured to store instructions for execution, and one or more processing devices configured to execute the instructions. The instructions are for causing the one or more processing devices to direct the access terminal to move to a first carrier frequency other than the shared carrier frequency if the access terminal operates on the shared carrier frequency in the active operational state. The access terminal is configured to communicate with the macro access point and the access terminal is not authorized to communicate with the private access point. N carrier frequencies are used by the macro access point, where $N \geq 2$.

Implementations may include one or more of the following features.

In the system, the instructions for execution may further include instructions for causing the one or more processing devices to configure a first carrier list for broadcast on a second carrier frequency other than the shared carrier frequency by the macro access point to the access terminal in the idle operational state of the access terminal. The first carrier list may not include the shared carrier frequency. Configuring the first carrier list for broadcast by the macro access point to the access terminal in the idle operational state of the access terminal may include configuring a set of N carrier lists for broadcast by the macro access point. Each particular carrier list of the set of N carrier lists may be broadcast by the macro access point on a corresponding particular different carrier frequency of the N carrier frequencies used by the macro access point. The N carrier frequencies may include the shared carrier frequency and the first carrier frequency. The set of N carrier lists may include the first carrier list and a second carrier list that is broadcast by the macro access point on the shared carrier frequency. The access terminal may be configured to select an idling carrier frequency from a received carrier list of the set of N carrier lists based on an algorithm. The access terminal may receive the received carrier list from the macro access point. The access terminal may be configured to idle on the idling carrier frequency in the idle operational state of the access terminal. All carrier lists of the set of N carrier lists may include no more than N−1 carrier list elements. The N−1 carrier list elements may correspond to certain carrier frequencies of the N carrier frequencies. All carrier lists of the set of N carrier lists may not include the shared carrier frequency as one of the N−1 carrier list elements.

In the system, the instructions for execution may further include instructions for causing the one or more processing devices to configure a first carrier list for broadcast on a second carrier frequency other than the shared carrier frequency by the macro access point to the access terminal in the idle operational state of the access terminal. Configuring the first carrier list for broadcast by the macro access point to the access terminal in the idle operational state of the access terminal may include configuring a set of N carrier lists for broadcast by the macro access point. Each particular carrier list of the set of N carrier lists may be broadcast by the macro access point on a corresponding particular different carrier frequency of the N carrier frequencies used by the macro access point. The N carrier frequencies may include the shared carrier frequency and the first carrier frequency. The set of N carrier lists may include the first carrier list and a second carrier list that is broadcast by the macro access point on the shared carrier frequency. All carrier lists of the set of N carrier lists may include N carrier list elements. The N carrier list elements may correspond to certain carrier frequencies of the N carrier frequencies. Different carrier lists of the set of N carrier lists may be permitted to have different elements from one another. The second carrier list may include the shared carrier frequency as one of the N carrier list elements. Configuring the set of N carrier lists for broadcast by the macro access point may include removing the shared carrier frequency from the first carrier list, and replacing the shared carrier frequency in the first carrier list with the second carrier frequency on which the first carrier list is broadcast by the macro access point, so that the second carrier frequency appears at least two times in the first carrier list. Configuring the set of N carrier lists for broadcast by the macro access point may further include removing the second carrier frequency from a third carrier list of the set of N carrier lists, removing the second carrier frequency from the second carrier list, and replacing the second carrier frequency in the third carrier list and the second carrier list with the shared carrier frequency, so that the shared carrier frequency appears at least two times in the third carrier list and the second carrier list. The private access point may be configured to direct the access terminal to move to the second carrier frequency if the private access point determines that the access terminal is within range of the private access point on the shared carrier frequency in the idle operational state of the access terminal. The private access point may be configured to direct the access terminal to move to the second carrier frequency based on the replacement of the shared carrier frequency in the first carrier list with the second carrier frequency. The system may further include the private access point. In the system, the instructions for execution may further include instructions for causing the one or more processing devices to send a paging message to the access terminal based on a registration message received from the access terminal. The access terminal may be configured to send the registration message to the macro access point in response to the access terminal being directed by the private access point to move to the second carrier frequency. In the system, the instructions for execution may further include instructions for causing the one or more processing devices to send a paging message to the access terminal on at least the shared carrier frequency and the second carrier frequency of the N carrier frequencies.

In the system, configuring the set of N carrier lists for broadcast by the macro access point may include removing the shared carrier frequency from the first carrier list, and replacing the shared carrier frequency in the first carrier list with the second carrier frequency on which the first carrier list is broadcast by the macro access point, so that the second carrier frequency appears at least two times in the first carrier list. In the system, the instructions for execution may further include instructions for causing the one or more processing devices to configure a roaming list for a set of access terminals. The set of access terminals may include the access terminal. In the system, the instructions for execution may further include instructions for causing the one or more processing devices to assign the second carrier frequency a reduced priority in the roaming list so that the set of access terminals is less likely to receive the first carrier list from the macro access point.

In the system, the instructions for execution may further include instructions for causing the one or more processing devices to configure an additional carrier list for broadcast by the macro access point so that a set of N+1 carrier lists is configured for broadcast by the macro access point. The set of N+1 carrier lists may include the set of N carrier lists. All carrier lists of the set of N+1 carrier lists may include N+1 carrier list elements. A second shared carrier frequency may be an additional frequency used by the macro access point so that N+1 carrier frequencies may be used by the macro access point. The N+1 carrier frequencies may include the N carrier frequencies. In the system, the instructions for execution may further include instructions for causing the one or more processing devices to remove the second shared carrier frequency from the first carrier list. A second private access point and the macro access point both may use the second shared carrier frequency. In the system, the instructions for execution may further include instructions for causing the one or more processing devices to replace the second shared carrier frequency in the first carrier list with the second carrier frequency on which the first carrier list is broadcast by the macro access point, so that the second carrier frequency appears at least three times in the first carrier list. In the system, the instructions for execution may further include instructions for causing the one or more processing devices to remove the second shared carrier frequency from a third carrier list of the set of N+1 carrier lists. In the system, the instructions for execution may further include instructions for causing the one or more processing devices to replace the second shared carrier frequency in the third carrier list with a third carrier frequency on which the third carrier list is broadcast by the macro access point, so that the second carrier frequency appears at least two times in the third carrier list.

In the system, the instructions for execution may further include instructions for causing the one or more processing devices to determine whether the access terminal is within range of the private access point in the active operational state of the access terminal. The directing may be performed if the access terminal is determined to be within range of the private access point. The private access point may not use the first carrier frequency. In the system, the instructions for execution may further include instructions for causing the one or more processing devices to receive one or more reports from the access terminal. The access terminal may be operating on the shared carrier frequency in the active operational state. The directing may be performed based on at least one report of the one or more reports received from the access terminal. The directing may be performed if the at least one report of the one or more reports received from the access terminal indicates that the access terminal is likely to be within range of the private access point. The one or more reports may include a first report sent by the access terminal on the shared carrier frequency. The first report may include measurements of one or more signals received by the access terminal on the shared carrier frequency. In the system, the instructions for execution may further include instructions for causing the one or more processing devices to analyze the first report. The directing may be performed based on the first report only, without knowledge of signal measurements on carrier frequencies of the N frequencies other than the shared carrier frequency. The first carrier frequency may be known to the macro controller to be a dedicated macro carrier frequency. The private access point may not use the first carrier frequency. The one or more reports may further include additional reports sent by the access terminal. The additional reports may include measurements of one or more signals received by the access terminal on one or more carrier frequencies of the N frequencies other than the shared carrier frequency. The private access point may not use the one or more carrier frequencies. The access terminal may be configured to send the additional reports independently of being requested to do so. The access terminal may be configured to compare measurements of received signals on the shared carrier frequency to one or more thresholds and to send the additional reports based a result of the comparison. In the system, the instructions for execution may further include instructions for causing the one or more processing devices to request that the access terminal send the additional reports. Requesting that the access terminal send the additional reports may include analyzing the first report, and requesting that the access terminal send the additional reports responsively to analysis of the first report. Requesting that the access terminal send the additional reports may include periodically requesting that the access terminal send the additional reports.

In the system, the instructions for execution may further include instructions for causing the one or more processing devices to configure a first carrier list for broadcast on a second carrier frequency other than the shared carrier frequency by the macro access point to the access terminal in the idle operational state of the access terminal. In the system, the instructions for execution may further include instructions for causing the one or more processing devices to, in an idle to active state of the access terminal, allocate a fourth carrier frequency to the access terminal for use by the access terminal in the active operational state of the access terminal. The macro access point may include the macro controller. The macro access point may be configured to communicate with to the macro controller over a backhaul connection. The fourth carrier frequency may include one of the shared carrier frequency, the first carrier frequency, or the second carrier frequency. The allocating may include allocating the fourth carrier frequency to the access terminal based on a carrier frequency allocation algorithm. The carrier frequency allocation algorithm may be based on the carrier frequency utilization of a set of access terminals communicating with the macro access point at corresponding carrier frequencies of the N carrier frequencies. In the system, the instructions for execution may further include instructions for causing the one or more processing devices to, if the fourth carrier frequency allocated to the access terminal includes the shared carrier frequency, then, analyze a report sent by the access terminal on the shared carrier frequency. The report may include measurements of one or more signals received by the access terminal on the shared carrier frequency. In the system, the instructions for execution may further include instructions for causing the one or more processing devices to, if the fourth carrier frequency allocated to the access terminal includes the shared carrier frequency, then, direct the access terminal to move to the first carrier frequency other than the shared carrier frequency if the report indicates that the access terminal is is likely to be within range of the private access point. The allocating may include receiving a request for a traffic channel from the access terminal on the shared carrier frequency, allocating the fourth carrier frequency to the access terminal based on the request. The fourth carrier frequency may include the shared carrier frequency. The allocating may include allocating the fourth carrier frequency to the access terminal according to an idling carrier frequency used by the access terminal in the idle operational state of the access terminal.

In the system, the instructions for execution may further include instructions for causing the one or more processing devices to configure a first carrier list for broadcast on a second carrier frequency other than the shared carrier frequency by the macro access point to the access terminal in the idle operational state of the access terminal. In the system, the instructions for execution may further include instructions for causing the one or more processing devices to, in an idle to active state of the access terminal, allocate a fourth carrier frequency to the access terminal for use by the access terminal in the active operational state of the access terminal. In the system, the instructions for execution may further include instructions for causing the one or more processing devices to receive one or more reports from the access terminal. The access terminal may be operating on a fifth carrier frequency other than the shared carrier frequency in the idle operational state. The fifth carrier frequency may be a dedicated macro frequency and the private access point may not use the fifth carrier frequency. In the system, the instructions for execution may further include instructions for causing the one or more processing devices to determine whether to allocate the shared carrier frequency to the access terminal based on at least one report of the one or more reports received from the access terminal. The shared carrier frequency may be allocated to the access terminal if the at least one report of the one or more reports received from the access terminal indicates that the access terminal is unlikely to be within range of the private access point. The one or more reports may include a first report sent by the access terminal on the shared carrier frequency. The first report may include measurements of one or more signals received by the access terminal on the shared carrier frequency. In the system, the instructions for execution may further include instructions for causing the one or more processing devices to request that the access terminal send the first report. The one or more reports may include a second report sent by the access terminal on the fifth carrier frequency. The second report may include measurements of one or more signals received by the access terminal on the fifth carrier frequency. The one or more reports may include additional reports sent by the access terminal. The additional reports may include measurements of one or more signals received by the access terminal on one or more carrier frequencies of the N frequencies other than the shared carrier frequency and the fifth carrier frequency. The private access point may not use the one or more carrier frequencies. In the system, the instructions for execution may further include instructions for causing the one or more processing devices to request that the access terminal send the additional reports. Requesting that the access terminal send the additional reports may include analyzing the first report, and requesting that the access terminal send the additional reports responsively to analysis of the first report.

The foregoing methods may be implemented as a computer program product comprised of instructions that are stored on one or more machine-readable media, and that are executable on one or more processing devices. The foregoing method may be implemented as an apparatus or system that includes one or more processing devices and memory to store executable instructions to implement the method. A graphical user interface may be generated that is configured to provide a user with access to and at least some control over stored executable instructions to implement the methods.

The details of one or more examples are set forth in the accompanying drawings and the description below. Further features, aspects, and advantages are apparent in the description, the drawings, and the claims.

DETAILED DESCRIPTION

Figure 1:
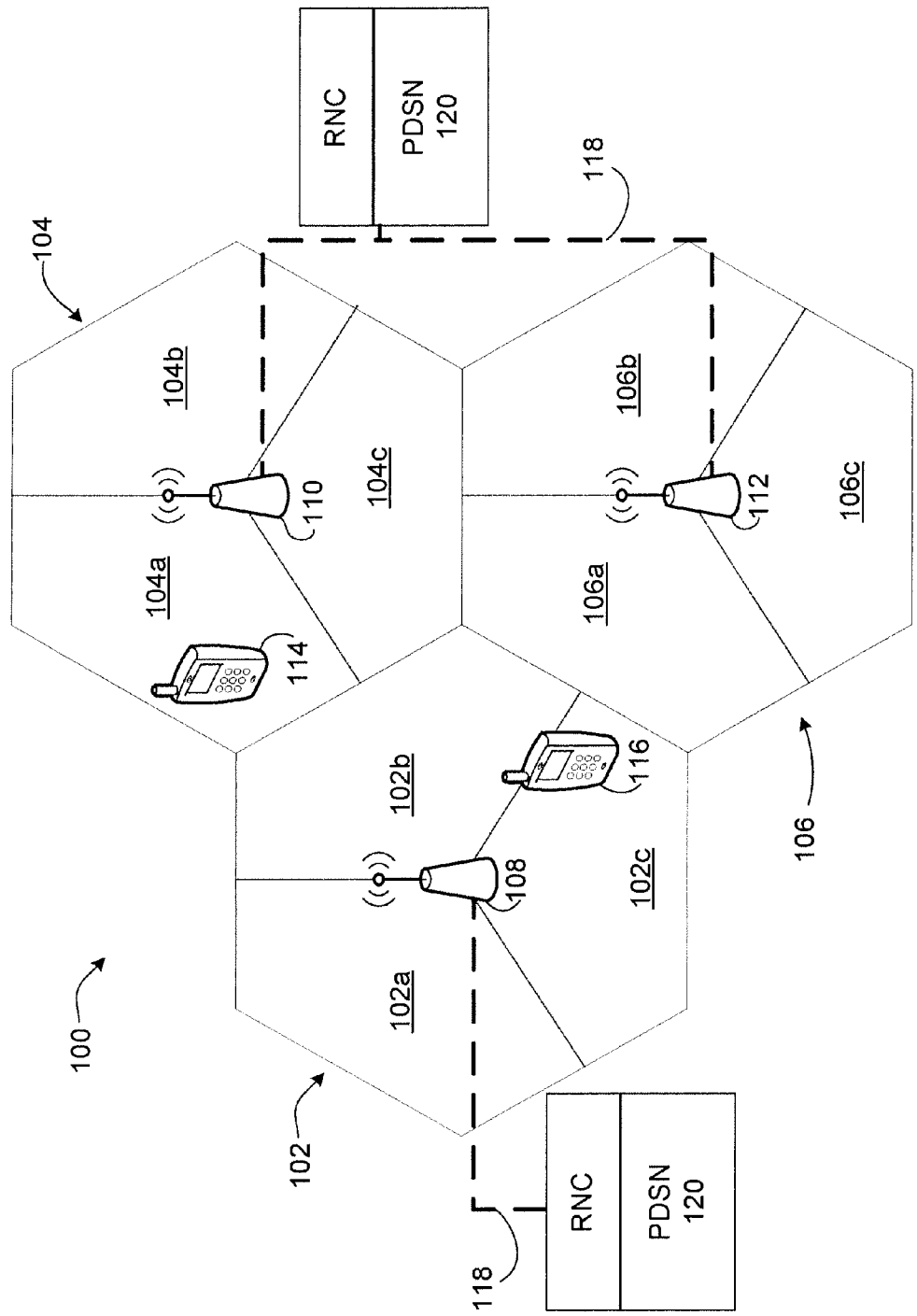
FIG. 1 shows a wireless network.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs, also known as mobile stations) located in the cell. Each cell is often further divided into sectors 102a-c, 104a-c, 106a-c by using multiple sectorized antennas. In each cell, that cell's radio network access point may serve one or more sectors and may communicate with multiple access terminals in its cell.

The radio access network (RAN) 100 shown in FIG. 1 uses a 1xRTT protocol or an EV-DO protocol to transmit voice and data packets between an access terminal, e.g., access terminals 114, 116, and a radio network access point, e.g., access points 108, 110, 112. In the example of FIG. 1, the access points 108, 110, 112 are connected over a backhaul connection 118 to radio network control/packet data serving nodes (RNC/PDSN) 120, which may be one or more physical devices at different locations. Although this description uses terminology from the 1-xRTT ("1x") and EV-DO ("DO") air interface standards in CDMA (Code Division Multiple Access) networks, the same concepts are applicable to other communication methods, including UMTS (Universal Mobile Telecommunications Service), GSM (Global System for Mobile Communications), HSDPA (High Speed Downlink Packet Access), WiMax (Worldwide Interoperability for Microwave Access), WiBro (Wireless Broadband), WiFi, and the like.

Figure 2:
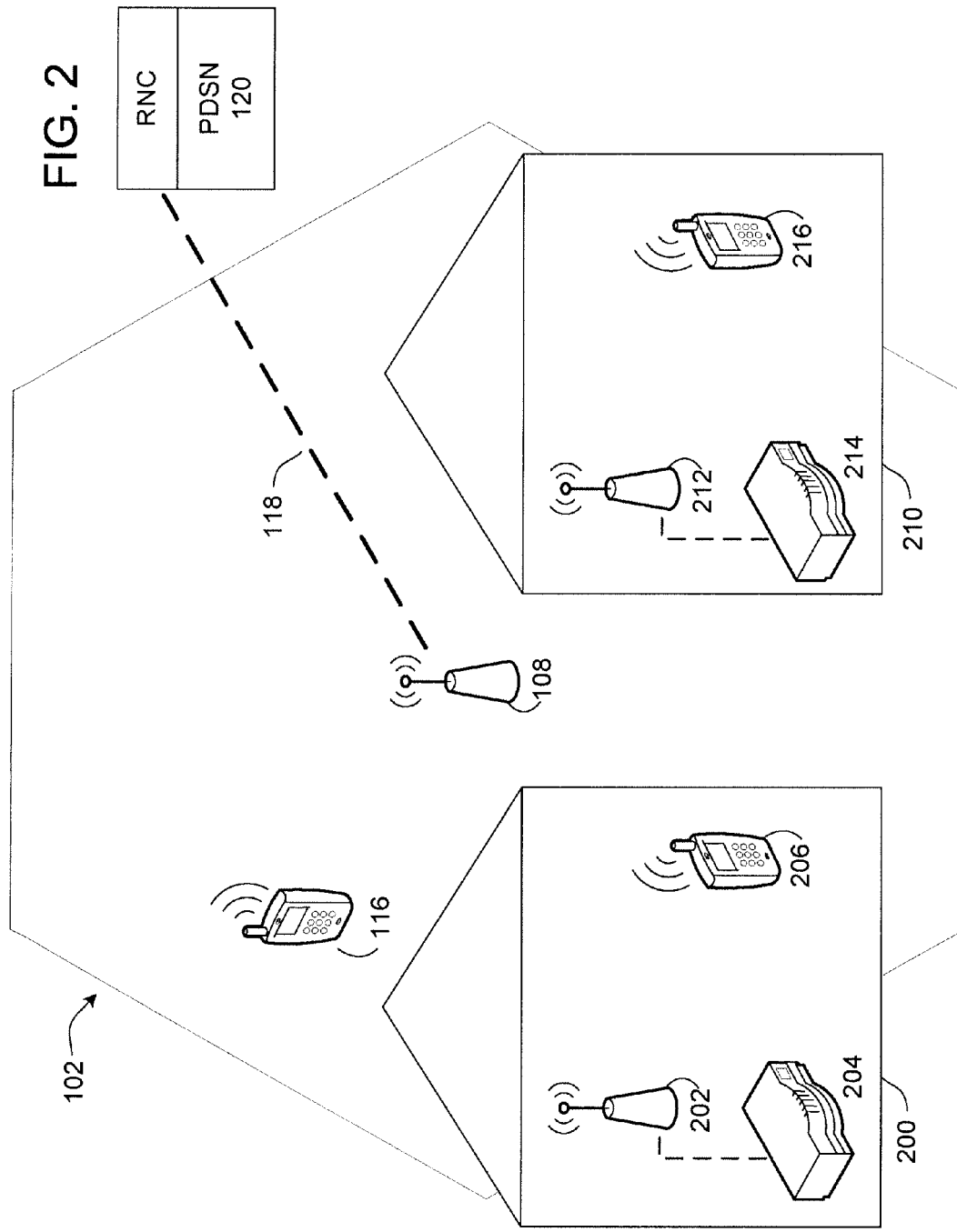
FIG. 2 shows a wireless network with a home networking deployment.

In some examples, as shown in FIG. 2, a radio network access point 202 may be deployed in a user's home 200 in a similar manner as a WiFi® access point. Such a radio network access point is referred to as a private access point. The private access point 202 may use an available high-speed internet connection, such as a DSL or cable modem 204, as the backhaul with the RNC/PDSN functionality implemented in the private access point 202. Such a private access point may be installed anywhere, for example, in an office, a public space, or a restaurant. When this description refers to a private access point being in a "home," that encompasses any such location. Private access points may include, for example, femtocells or picocells. In some examples, a private access point may be integrated into a cable modem or other network hardware, such as a router or WiFi access point.

When an authorized access terminal 206 is present inside the home (or anywhere within range of the private access point 202), it may use the private access point 202 rather than a regular cellular radio network access point, such as the access point 108, to place or receive voice calls and data connections, even if the access terminal is otherwise within the cell 102 for that access point 108. We sometimes refer to the standard access point 108 as a macro access point or macro BTS to distinguish the standard access point 108 from a private access point, as the standard access point 108 provides direct access to the wider RAN.

A neighboring home 210 may have its own private access point 212 connected to its cable modem 214 for use by its owner's access terminal 216. Neighboring private access points may operate independently, in part because real-time communications is difficult between neighboring private access points. Private access points may also operate in a licensed spectrum. Some details and examples of the operation of private access points are discussed in co-pending application Ser. No. 11/640,501, titled Provisioning Private Access Points for Wireless Networking, filed Dec. 15, 2006 and incorporated here by reference, Ser. No. 11/640,503, titled Configuring Preferred User Zone Lists for Private Access Points for Wireless Networking, filed Dec. 15, 2006 and incorporated here by reference, Ser. No. 11/735,073, titled Controlling Access to Private Access Points for Wireless Networking, filed Apr. 13, 2007 and incorporated here by reference, and Ser. No. 11/960,100, titled Managing Communications with Private Access Points in Wireless Networks, filed Dec. 19, 2007 and incorporated here by reference.

Access lists of authorized access terminals for each private access point can be configured and distributed to private access points, such as private access points 202, 212. Access location lists such as preferred roaming lists (PRLs) that may contain information to locate, identify, and access sets of private access points and other access points may be configured and distributed to access terminals. The authorization lists and PRLs may be updated periodically.

The access terminal 116 of FIG. 2 may not be authorized to communicate with the private access points 202, 212 and may instead communicate with macro access points, such as the macro access point 108. The access terminal 116 may be referred to as a macro access terminal (MAT) 116. As in FIG. 1, the macro access point 108 of FIG. 2 is connected over the backhaul connection 118 to the radio network control/packet data serving nodes (RNC/PDSN) 120, which may be one or more physical devices at different locations. The RNC/PDSN 120 may be referred to as one or more macro controllers, or one or more macro radio network controllers (macro RNC). The macro RNC 120 may include functionality to manage macro access points, such as the macro access point 108, and facilitate communication between the macro access point 108 and access terminals, such as the access terminal 116. In general, any function attributed to the RNC/PDSN 120 may be implemented in the RNC/PDSN 120, in one or more macro access points such as the macro access point 108, or in any combination thereof. It should be understood that an access terminal may send signals to and receive signals from the macro access point 108. While the macro RNC 120 may be referred to as communicating with the MAT 116 (or vice versa), it should be understood that this communication may be via or by the macro access point 108.

In some implementations, for, e.g., reasons of spectral efficiency, many private access points in a given metropolitan area may operate on the same uplink/downlink frequency pair, or in one of a defined set of frequency pairs. The private access points, such as private access points 202, 212, may also operate on the same frequency as that of one or more macro access points, such as the macro access point 108, located in the same metropolitan area. Private access points that share a carrier frequency with one or more macro access points may interfere with access terminals that may be communicating with the macro access points on the shared carrier frequency. Similarly, access terminals that may be communicating with the macro access points on a shared carrier frequency may interfere with private access points that are using the same shared carrier frequency.

Figure 3:
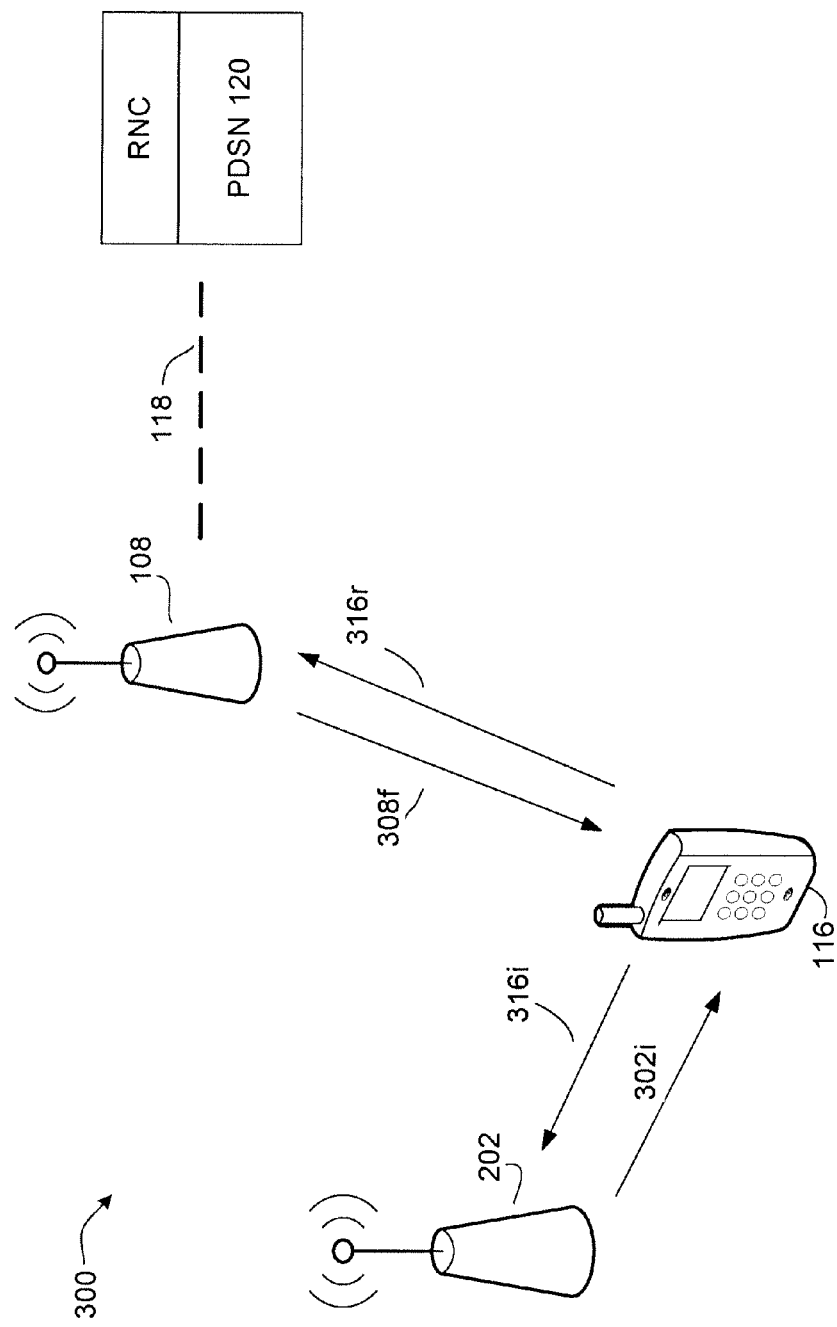
FIG. 3 shows a wireless network.

For example, as shown in FIG. 3, the private access point 202 may interfere with the macro access terminal 116, and vice versa. The macro access terminal 116 may communicate with the macro access point 108 via a reverse link, that is, by transmitting signals 316r to the macro access point 108.

Reverse link includes transmissions from an access terminal to an access point. The macro access point 108 may communicate with the macro access terminal 116 via a forward link, that is, by transmitting signals 308f to the macro access terminal 116. Forward link includes transmissions from an access point to an access terminal. The macro access terminal 116 may be communicating with the macro access point at a carrier frequency F2. It may be that the carrier frequency F2 is only used by one or more macro access points (in, say, a particular cell or cell sectors). Thus, in this case the carrier frequency F2 would be a dedicated macro frequency, i.e., a frequency not utilized for communication by private access points within the particular cell, for example.

The macro access terminal 116, however, may be communicating with the macro access point 108 at a carrier frequency F1. The private access point 202 may also use the carrier frequency F1 for communications with authorized access terminals such as the access terminal 206 (not shown). Thus, in this case the carrier frequency F1 would be a shared carrier frequency, that is, a carrier frequency shared by (at least) the private access point 202 and the macro access point 108. The private access point 202 may be transmitting signals 302i that may interfere with the macro access terminal 116 if the macro access terminal is nearby or within range of the private access point 202 (for example, in or nearby the home 200 of FIG. 2). The macro access terminal 116 may also cause interference, shown by the signals 316i in FIG. 3, to the private access point 202 when the access terminal communicates (see signals 316r) with the macro access point 108.

For ease of description, communication between wireless network entities, such as between access points and access terminals, is described as occurring at the access point transmission frequency. In general, however, for example, frequency division duplex (FDD) may be used where the transmit frequency of an entity may be associated with, but distinct from, the receive frequency of the entity.

An access terminal such as the macro access terminal 116 may be described as including three operational states: an "idle" state, an "idle to active" state, and an "active" state. The idle state may include a period during which the access terminal is turned on and "idling" on a carrier frequency, but is dormant and not actively communicating with an access point (or communicating with the RAN 100 via an access point). The idle to active state may include a period during which the access terminal transitions from a dormant, idling state to an active communicating state, such as when the access terminal is trying to make or receive a phone call. The active state may include a period during which the access terminal is actively communicating with an access point (or communicating with the RAN 100 via an access point).

According to an example, assume that the macro access point 108 and the private access point 202 share a carrier frequency F1 for communications. Further assume that at least one other carrier frequency F2 is used by the macro access point 108 (and other macro access points) and not by the private access point 202. According to techniques described herein, interference between the private access point 202 and the access terminal 116 may be mitigated or may even be avoided in the idle, idle to active, and active operational states of the access terminal 116 by causing the access terminal 116 to use (for example) the frequency F2 rather than the shared carrier frequency F1, while in these states.

Figure 4:
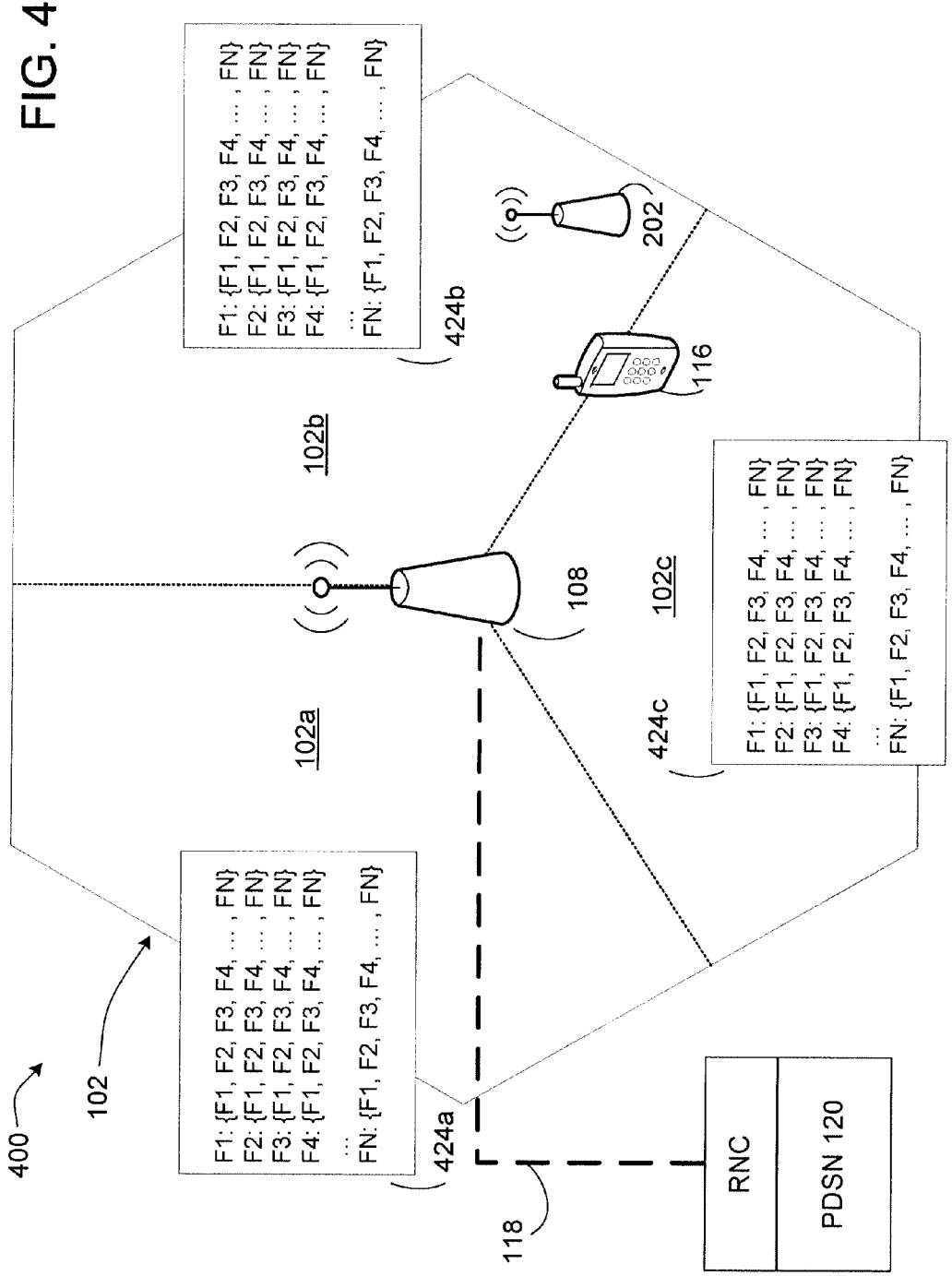
FIG. 4 shows a wireless network including a cell.

FIG. 4 shows a wireless network 400 that includes the macro access point 108, the (macro) access terminal (MAT) 116, and the private access point 202, all located within the cell 102. The macro access point 108 communicates at a number of carrier frequencies ("carrier frequencies," "frequencies," "carriers") N: F1, F2, F3, F4, . . . , FN. Although four or more distinct carrier frequencies are shown in FIG. 4, N may generally be greater than or equal to two; that is, the wireless network 400 may have two or more frequencies.

The macro access point 108 broadcasts sets of carrier lists 424a, 424b, 424c. The macro access point 108 may receive the sets of carrier lists 424a, 424b, 424c for broadcast from the macro RNC 120 (the RNC/PDSN 120). The macro access point 108 typically broadcasts the same carrier lists in all sectors 102a, 102b, 102c of the cell 102. In general, the macro access point 108 periodically broadcasts one signal per sector per carrier frequency, with one carrier list in each sector on each carrier frequency. More particularly, for the particular carrier frequency FN, the macro access point 108 may broadcast, on that carrier frequency FN, the identical carrier list FN: {F1, F2, F3, F4, . . . , FN} in all sectors 102a, 102b, 102c. For the carrier frequency F3, the macro access point 108 may broadcast, on that carrier frequency F3, the identical carrier list F3: {F1, F2, F3, F4, . . . , FN} in all sectors 102a, 102b, 102c. The carrier list may be a list of frequencies that may be used by the macro access terminal (MAT) 116 to determine which frequency the MAT 116 should be idling on in the idle operational state of the MAT 116.

In a CDMA network such as the RAN 100, several access points that operate in the same area may use the same frequency and thus the access points may interference with one another. To distinguish between signals from different access points transmitting on the same frequency, pseudo noise (PN) offsets may be used to identify the shifts in the signal sequences relative to one another. Private access points in the RAN 100 may have dedicated PN offsets that are not used by macro access points, so that a private access point such as the private access point 202 may share the same carrier frequency with a macro access point such as the macro access point 108.

Macro access points such as the macro access point 108 may also broadcast "neighbor lists" to access terminals such as the access terminal 116. Similarly, private access points such as private access point 202 may likewise broadcast neighbor lists to access terminals such as the access terminal 116. For a macro access point such as the macro access point 108, a neighbor list broadcast on a given frequency and sector by the macro access point may include PN offset information and possibly frequency information for neighboring macro access points in other cells, for different sectors or different frequencies of the same macro access point, and for private access points that are in or near the macro sector. For a private access point such as the private access point 202, a neighbor list broadcast on a given frequency by the private access point may include PN offset information and possibly frequency information regarding nearby macro access points. The private access point neighbor lists may include information about other private access points as well. The respective neighbor lists from the macro and private access points may be sent to an access terminal, for example, (1) to tell the access terminal what signals the access terminal should be scanning for, so that the access terminal need not search for an unknown number of access points on an unknown number of frequencies, and (2) to give the access terminal a way of distinguishing between signals from different access points at the same frequency. The access terminal may scan for signals on a particular frequency based on the neighbor list and may use the list to move to the strongest signal (in terms of Signal to Noise ratio) that the access terminal finds.

Access terminals such as the access terminals 116, 206, 216 of FIG. 2 may store an access location list such as a PRL. A PRL may list identifiers or addresses of access points with which an access terminal may communicate. An access terminal may select an access point using the list for communication according to the 1xRTT air interface standard, the EV-DO air interface standard, or both. A typical PRL may be divided into two rectangular tables having rows and columns, a System Table and an Acquisition Table. A row in the Acquisition Table may correspond to one or more rows in the System Table. A typical row in the Acquisition Table may include an entry identifying a system type, such as the air interface standard (1-xRTT or EV-DO) applying to that row. A typical row may further include a set of carrier frequencies which the access terminal may use for communication with an access point. The System Table includes rows that have links into the Acquisition Table, so that a network address or identifier, such as System ID/Network ID (SID/NID) may be associated with a set of carrier frequencies in the Acquisition Table via the links.

The Acquisition Table rows may be indexed and listed in descending order of acquisition priority. That is, the lower the row index, the higher the priority for (1x or DO standard) communication. In other implementations, other orders of priority, table listings, and table arrangements are possible. Similarly, a set of carrier frequencies included in a row of the table may have its own priority since an access terminal may attempt to acquire a channel by listening to the carrier frequencies in the set of carrier frequencies one by one in the order that they are listed.

In the wireless network 400 of FIG. 4, the macro access terminal (MAT) 116 may not be authorized to communicate with the private access point 202. This may mean that a unique identifier, such as an International Mobile Subscriber Identity (IMSI), of the MAT 116 is not included in an access list stored on the private access point 202. As a result, the private access point 202 and the MAT 116 may interfere with one another when the private access point 202 is sharing a carrier frequency with the macro access point 108. In the idle operational state, the MAT 116 boots up or is powered up and searches for an access point to communicate with, and may ultimately acquire, for example, respective 1x and DO signals of an access point. The MAT 116 that boots up may first consult the PRL of the MAT 116 at the Acquisition Table of the PRL. The MAT 116 may attempt to acquire a channel by listening to the sets of carrier frequencies for 1x communications listed in the rows of the Acquisition Table. The MAT 116 may begin with the highest priority rows of the Acquisition Table to obtain an initial carrier frequency, for example, a high priority row may include all or some frequencies F1, F2, F3, F4, . . . , FN in some order, e.g. F3, F2, F1. When the MAT 116 hears a broadcast message with a SID/NID from an access point on one of the selected frequencies for 1x communications, e.g., on frequency F3, the MAT 116 may consult System Table row in the PRL corresponding to the received SID/NID. The MAT 116 may then examine the list of SID/NIDs in the System Table to see if there are any SID/NID identifiers that are higher in priority than the received SID/NID. If a higher priority SIDMNID identifier is in the System Table of the PRL, the MAT 116 is directed to a corresponding set of one or more carrier frequencies that are located in an Acquisition Table row corresponding to the higher priority SID/NID identifier. The MAT 116 may attempt to acquire a channel by listening to the set of one or more carrier frequencies, one by one, in order, for 1x communication. The MAT 116 thus finds an initial carrier frequency for 1x communications that is one of the set of one or more carrier frequencies corresponding to the highest priority SID/NID.

The macro access point 108 in the wireless network 400 may be at the highest priority in the PRL. On the initial carrier frequency, the MAT 116 may hear a carrier list broadcast by the macro access point 108. In FIG. 4, the carrier lists broadcast by the macro access point 108 are the same across all carrier frequencies F1, F2, F3, F4, . . . , FN and across all sectors 102a, 102b, 102c. That is, whatever the initial carrier frequency, say F3, the MAT 116 may receive the following carrier list {F1, F2, F3, F4, . . . , FN} broadcast from the macro access point 108. As described above, the carrier list may be a list of frequencies that may be used by the MAT 116 to determine which frequency the MAT 116 should be idling on in the idle operational state of the MAT 116. The MAT 116 may select a carrier frequency for idling based on a hashing algorithm applied to the carrier list broadcast by the macro access point 108 on the initial carrier (say F3). The MAT 116 may be configured to select one of the carrier frequencies from the (here) N element carrier list F3: {F1, F2, F3, F4, . . . , FN} on the basis of the unique identifier of the MAT 116. That is, for a given MAT 116 having a given unique identifier, the MAT 116 may always pick the same element from an X element list. For example, a first example macro access terminal receiving (say) a four element list, will, according to a hashing algorithm applied to its unique identifier, always select the second element in the list, while a second example macro access terminal receiving a four element list, will, according to a hashing algorithm applied to its own unique identifier, always select the third element. While the same macro access terminal may always select the same carrier frequency element from a list of X carrier frequency elements, macro access terminals are distributed on a random basis with unique identifiers. Thus, system-wide, or network-wide, the carrier frequency selection for idling by the macro access terminals may end up approaching a random distribution.

A private access point, such as the private access point 202, may send a one element carrier list consisting of the frequency at which the private access point transmits. A macro access terminal that applies its hashing algorithm to its unique identifier for a one element list (such as a private access point carrier list) will be configured to select that one element.

The carrier frequency that the MAT 116 may select for idling based on application of its hashing algorithm may become a default idling frequency for the MAT 116. The MAT 116 may be redirected to another frequency by, for example, another access point, but otherwise the MAT 116 may default to idling on the selected frequency.

According to an example using the wireless network 400, the macro access point 108 and the private access point 202 share the frequency F1 for communication. The frequencies F2, F3, F4, . . . , FN are not used by the private access point 202. The MAT 116 may select an initial carrier frequency F3 for 1x communication using the PRL of the MAT 116. The MAT 116 may hear a carrier list F3: {F1, F2, F3, F4, . . . , FN} broadcast by the macro access point 108 on the initial carrier frequency F3. The particular MAT 116 may be configured to select the first element when given an N element carrier list so that upon receipt of the carrier list F3: {F1, F2, F3, F4, . . . , FN} the MAT 116 may select the carrier frequency F1 (the first element) for idling. The MAT 116 may idle on the carrier frequency F1, which happens to be a carrier frequency shared with private access point 202.

The MAT 116 may not be authorized to use the private access point 202. As the MAT 116 moves nearby or into the range of the private access point 202, the signal (on carrier frequency F1) from the private access point 202 may be stronger than the signal from the macro access point (on carrier frequency F1). The MAT 116 may hear a broadcast message from the private access point 202 (e.g., the private access point carrier list) that has a SID/NID different from the SID/NID of the macro access point 108.

The MAT 116 may then attempt to register on the private access point 202. Since the MAT 116 may not be authorized to use the private access point 202, the private access point 202 may reject the registration message and the MAT 116. The MAT 116 may then blacklist the SID/NID of the private access point 202 so that the MAT 116 may then return to the PRL and may select another initial carrier frequency that is not based on the SID/NID from the private access point 202. The PRL may again direct the MAT 116 to the initial carrier frequency F3 or to another initial carrier frequency. Since all carrier lists in the wireless network 400 of FIG. 4 are identical, the particular initial carrier selected does not matter. That is, the MAT 116 may apply the same hashing algorithm to select that first element F1 in the carrier list {F1, F2, F3, F4, ..., FN}. Thus, the MAT 116 will again attempt to idle on the shared carrier frequency F1.

The MAT 116 may still be in range of the private access point 202, may hear the stronger broadcast signal from the private access point 202 and the blacklisted SID/NID in the signal. The MAT 116 may enter a power save mode for a time period (such a one minute) for 1x communications. After the time period, the MAT 116 may then repeat the procedure, but if the MAT 116 is still nearby or in range of the private access point 202, the MAT 116 may face the same result and may become stuck in a coverage hole. That is, a consumer using the MAT 116 may be unable to get any cellular coverage at all, making receiving or making calls problematic at best. The MAT 116 may also attempt to connect to another macro network using the PRL (for example, a macro access point from a different wireless provider). This means that the consumer might be faced with having the MAT 116 "roam" on another wireless carrier's network, which may be more expensive than using the macro network of its own wireless carrier. This situation may continue until the MAT 116, for example, moves away from the private access point 202.

Interference Mitigation Techniques

In general, in a wireless network where a private access point shares a carrier frequency with one or more macro access points, interference from a private access point to a macro access terminal (and vice versa) may be mitigated or may even be avoided by several techniques. For example, some techniques involve keeping the macro access terminal from operating on the shared carrier frequency when the macro access terminal moves nearby or in range of the potentially interfering private access point.

As described above, an access terminal such as the macro access terminal 116 may be described as including three operational states: an "idle" state, an "idle to active" state, and an "active" state. Several techniques may be used, alone or in combination, to mitigate interference at the macro access terminal.

1. Shared Carrier Frequency Not Included in any Carrier Lists

Figure 5:
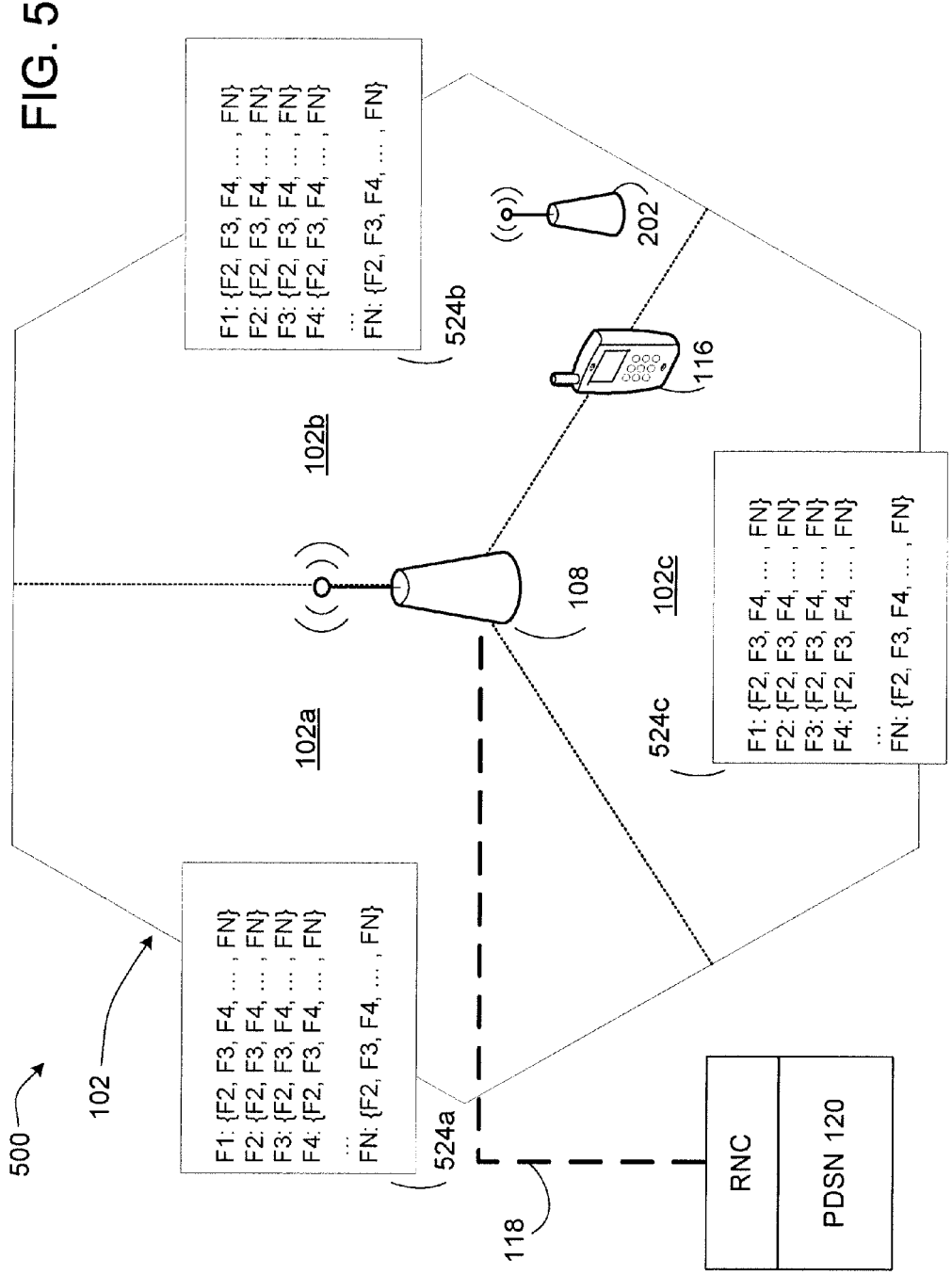
FIGS. 5-9 show wireless networks including cells and example carrier lists.

Referring to FIG. 5, this example assumes that the macro access point 108 broadcasts at N carrier frequencies, F1, F2, F3, F4, ..., FN and that the macro access point 108 shares a carrier frequency F 1 with the private access point 202 for communications. While the example shown in FIG. 5 and described in more detail below assumes that the carrier frequencies F2, F3, F4, ..., FN may be dedicated macro carrier frequencies that no other private access point may use, the techniques described herein are more general. For example, one or more of the carrier frequencies F2, F3, F4, ..., FN may also be shared with private access points (other than the private access point 202), and at least one carrier frequency may be a dedicated macro carrier frequency that no other private access point may use.

The wireless network 500 of FIG. 5 includes the macro access point 108, the MAT 116, and the private access point 202, all located within the cell 102.

1.A. Idle Operational State

As described above, the idle state may include a period during which the access terminal is turned on and "idling" on a carrier frequency, but is dormant and not actively communicating with an access point (or communicating with the RAN 100 via an access point). The macro access point 108 broadcasts sets of carrier lists 524a, 524b, 524c. The macro access point 108 may receive the sets of carrier lists 524a, 524b, 524c for broadcast from the macro RNC 120 (the RNC/PDSN 120). The macro access point 108 typically broadcasts the same carrier lists in all sectors 102a, 102b, 102c of the cell 102. In general, the macro access point 108 periodically broadcasts one signal per sector per carrier frequency, with one carrier list in each sector on each carrier frequency.

Each carrier list of the sets of carrier lists 524a, 524b, 524c includes all of the carrier frequencies F2, F3, F4, ..., FN other than the shared carrier frequency F1. For example, for the particular carrier frequency FN, the macro access point 108 may broadcast, on that carrier frequency FN, the identical carrier list FN: {F2, F3, F4, ..., FN} in all sectors 102a, 102b, 102c. For the carrier frequency F2, the macro access point 108 may broadcast, on that carrier frequency F2, the identical carrier list F2: {F2, F3, F4, ..., FN} in all sectors 102a, 102b, 102c. Similarly, for the shared carrier frequency F1, the macro access point 108 may broadcast, on that shared carrier frequency F1, the identical carrier list F1: {F2, F3, F4, ..., FN} in all sectors 102a, 102b, 102c. As described above, while certain techniques described below assume that only the carrier frequency F1 may be shared with private access points, additional carrier frequencies may also be shared. For example, when carrier frequencies such as F2 and F3 are also shared with private access points, these carrier frequencies F2 and F3 may also be excluded from carrier lists broadcast by a macro access point.

As described above, the carrier list may be a list of frequencies that may be used by the macro access terminal (MAT) 116 to determine which frequency the MAT 116 should be idling on in the idle operational state of the MAT 116. As described above, the MAT 116 may be configured to select one of the carrier frequencies from the (here) "N−1" element carrier list {F2, F3, F4, ..., FN} on the basis of the unique identifier of the MAT 116. That is, for a given MAT 116 having a given unique identifier, the MAT 116 may always pick the same element from an X element list, based on a hashing algorithm applied to the unique identifier.

In FIG. 5, the shared carrier frequency F1 is not included in any carrier list of the sets of carrier lists 524a, 524b, 524c. Therefore, the MAT 116 will not idle on the shared carrier frequency F1 in the idle operational state of the MAT 116. Thus, even if the MAT 116 is located nearby or in range of the private access point 202, the MAT 116 will be idling on a different frequency, i.e., one of F2, F3, F4, ..., FN, and the MAT 116 will not affect or be affected by the private access point 202.

1.B. Idle to Active Operational State

As described above, the idle to active state may include a period during which the access terminal transitions from a dormant, idling state to an active communicating state, such as when the access terminal is trying to make or receive a phone call. There are several possible techniques that may be used in the instance where the shared carrier frequency F1 is not listed in any carrier list and thus the MAT 116 does not idle on the shared carrier frequency F1. Some techniques may include allocating the shared carrier frequency F 1 to the MAT 116 in the idle to active transition, with a goal being to do so when the MAT 116 is outside of range of the private access point 202.

An access terminal, such as the MAT 116, may send reports of received signals while in the active, or the idle to active, operational states. These reports may be "pilot" reports that include signal to interference noise (SINR) ratios of pilot signals received by the MAT 116. These pilot reports may indicate the objective and relative quality of pilot signals received by the MAT 116. In general, the MAT 116 may send pilot reports on the frequency that the MAT 116 is presently using. For example, if the MAT 116 is using the frequency F1 in active operation, the MAT 116 may send pilot reports of signals received on that frequency to the macro access point 108 and the macro RNC 120. The MAT 116 may also send pilot reports in the idle to active operational state.

The MAT 116 may typically include one transmitter/receiver. So as not to disrupt transmission on the transmitter/receiver, the MAT 116 may not in general monitor or measure signals on other frequencies than the carrier frequency that the MAT 116 may be presently using for transmission. In an implementation, however, the macro RNC 120 may direct the MAT 116 to monitor signals on other frequencies and to send pilot reports on these other frequencies. The macro RNC 120 may, for example, send one or more commands to the MAT 116 via the macro access point 108 directing the MAT 116 to make interfrequency measurements. For example, for communications according to the 1x-RTT standard, the macro RNC 120 may send a Candidate Frequency Search Request message to the MAT 116 via the macro access point 108. For example, for communications according to the EV-DO Rev. A standard, a RouteUpdateRequest message may be sent to the MAT 116 via the macro access point 108.

As discussed below, in some implementations, the MAT 116 may be configured to independently monitor signals on other frequencies than the carrier frequency the MAT 116 may be presently using, and to send pilot reports on these other frequencies. That is, the MAT 116 may, on its own, make interfrequency measurements and send pilot reports to, e.g., the macro RNC 120 via the macro access point 108. For example, the MAT 116 may send pilot reports regarding other frequencies if certain signal strengths of received signals on the currently used frequency fall below one or more thresholds.

In one technique, the MAT 116 may make a transition from the idle to the active state using the frequency that the MAT 116 is already idling on. However, since the shared carrier frequency F1 is not listed in any carrier list of sets of carrier lists 524a, 524b, 524c, the MAT 116 may never idle on the shared carrier frequency F1. Thus, this technique may result in no active operational state access terminals idling on the shared carrier frequency F1, unless the MAT 116 is otherwise moved to the shared carrier frequency F1. This may lead to an imbalance in the load distribution of carrier frequencies used by access terminals in an active operational state. For example, all access terminals in the cell may be in active communication on frequencies other than the shared carrier frequency F1.

In another technique, the macro RNC 120 of FIG. 5 may implement a carrier frequency allocation algorithm, such as a Multi-Carrier Traffic Allocation (MCTA) algorithm, to decide which access terminals should use which carrier frequencies in the active operational state. The allocation algorithm may be based substantially on the existing relative load of the available carrier frequencies, rather than on pilot reports that the macro RNC 120 may receive from the MAT 116 via the macro access point 108. For example, the macro RNC 120 may analyze existing access terminal carrier frequency usage in the active operational state and may observe that, say, ten access terminals are using frequency F2 for, e.g., voice calls, seventeen are using frequency F3, fifteen are using frequency F4, and so on, while only (say) three access terminals are using frequency F1. Thus, in this example situation of an unbalanced carrier load, the macro RNC 120 may assign an access terminal such as the MAT 116 to the shared carrier frequency F1, notwithstanding that the macro RNC 120 may know that carrier frequency F1 is a shared frequency and thus that the MAT 116 may encounter interference from a private access point, depending on the location of the MAT 116. In an implementation, once the macro RNC 120 has allocated the MAT 116 to a shared carrier frequency F1, the macro RNC 120 may then examine pilot reports that may be sent from the MAT 116 on the shared carrier frequency F1. Examining the pilot reports may help the macro RNC 120 to determine whether the MAT 116 should be moved to another frequency other than the shared carrier frequency F1, for example, because the MAT 116 may be nearby or in range of the private access point 202, as evidenced by the pilot reports. The macro RNC 120 may determine that an error was made in allocating the MAT 116 to the shared carrier frequency F1 and may remedy the error by transferring the MAT 116 to another frequency, e.g. F2, not used by the private access point 202.

In other techniques, the macro RNC 120 (via the macro access point 108) may direct the MAT 116 to provide a pilot report on the shared carrier frequency F1 so that the macro RNC 120 may determine whether the MAT 116 may be allocated the shared carrier frequency F1 for the idle to active transition. In general, the MAT 116 may send pilot reports on the frequency that the MAT 116 is presently using. In this instance, the MAT 116 may not idle on carrier F1, so the MAT 116 may not normally send pilot reports regarding measurements made on carrier frequency F1 to the macro RNC 120. In an implementation, however, the macro RNC 120 may direct the MAT 116 to monitor signals on the shared carrier frequency F1 and to send pilot reports on the shared carrier frequency F1. The macro RNC 120 may, for example, send one or more commands to the MAT 116 via the macro access point 108 directing the MAT 116 to make interfrequency measurements.

The macro RNC 120 may examine pilot reports from the MAT 116 on the shared carrier frequency F1. In an implementation, the macro RNC 120 may compare these pilot reports with pilot reports received from the MAT 116 on other frequencies, such as the idling frequency or other frequencies that the macro RNC 120 may command the MAT 116 to monitor. That is, the macro RNC 120 may compare the pilot report measurement from the MAT 116 on the shared carrier frequency F1 to pilot reports from the MAT 116 on one or more other carrier frequencies. If the measurements are comparable to one another in terms of pilot signal strength, the macro RNC 120 may decide, for example, to allocate a carrier frequency to the MAT 116 based on system-wide load balancing considerations. If a pilot report measurement from the MAT 116 on a carrier frequency other than F1 indicates a strong pilot signal relative to, for example, the pilot report measurements on the shared carrier frequency F1, the macro RNC 120 may allocate that carrier frequency to the MAT 116. In an implementation, the macro RNC 120 may assess the pilot report measurement from the MAT 116 on the shared carrier frequency F1 in isolation from other frequencies (whether or not such frequency measurements were made). The macro RNC 120 may decide to allocate the shared carrier frequency F1 to the MAT 116 if the pilot report indicates a strong macro pilot signal at the MAT 116 on the shared carrier frequency F1, irrespective of what may be occurring on the other carrier frequencies. In general, any combination of allocation techniques may be used based on analyses of a pilot report from the MAT 116 on the shared carrier frequency F1 (together with or in isolation from any pilot reports from the MAT 116 on other carrier frequencies).

The macro RNC 120 may use pilot reports from the MAT 116 on the shared carrier frequency F1 as a proxy for determining whether or not the MAT 116 is within range of the private access point 202 and thus for whether the shared carrier frequency F1 may be allocated to the MAT 116. For example, a pilot report from the MAT 116 regarding a pilot signal received from the macro access point 108 may indicate a weak or poor macro pilot signal. This may be due to interference at the MAT 116 from the private access point 202, for example, since the SINR of the macro pilot signal may decrease with more interference from the private access point 202. A small SINR of the macro pilot signal may also occur because the MAT 116 may be out of range of the macro pilot signal. This may occur whether or not the MAT 116 is in range of the private access point 202. In an implementation, the macro RNC 120 may examine the pilot report for the strength of macro pilot signal at the MAT 116. In other implementations, the macro RNC 120 may examine pilot reports from the MAT 116 for specific information regarding the strength of any private access point signal received at the MAT 116.

If the MAT 116 has been allocated the shared carrier frequency F1 for, e.g., a call, or has been actively communicating on, e.g., a call, using the shared carrier frequency F1, then the MAT 116 may, upon completion of the call and upon return to a dormant or idle operational state, examine the carrier list at the shared carrier frequency F1: {F2, F3, F4, . . . , FN} and may return to the carrier frequency that the MAT 116 had used for idling. That is, the MAT 116 may return to one of F2, F3, F4, . . . , FN for idling based on the result of the hashing algorithm applied to the unique identifier of the MAT 116.

1.C. Active Operational State

As described above, the active state may include a period during which the access terminal is actively communicating with an access point (or communicating with the RAN 100 via an access point). There are several possible techniques that may be used in the active operational state of the MAT 116 to, for example, move the MAT 116 away from the shared frequency F1 when one or more pilot reports from the MAT 116 indicate that the MAT 116 may be nearby or within range of the private access point 202 and experiencing interference from the private access point 202. In some implementations, the techniques may involve the macro RNC 120 examining pilot reports from the MAT 116 on carrier frequencies other than the shared carrier frequency F1. In other implementations, the techniques may involve the macro RNC 120 using pilot reports from the MAT 116 on the shared carrier frequency F1 without the MAT 116 making measurements and providing pilot reports on other carrier frequencies than the shared carrier frequency F1.

In general, the MAT 116 may measure and provide pilot reports on the current shared frequency F1 that the MAT 116 may be using. The MAT 116 will provide a pilot report on significant (in terms of strength) signals that the MAT 116 receives. The MAT 116 may receive and measure pilot signals from the macro access point 108 and may provide pilot reports that may include the signal to interference noise ratio (SINR) for the received macro pilot signals. Likewise, if the MAT 116 is in range of the private access point 202 so that the MAT 116 receives significant pilot signals from the private access point 202, the MAT 116 may measure these pilot signals and may provide pilot reports that may include the SFNR for the received private access point pilot signals.

The MAT 116 may typically include one transmitter/receiver. So as not to disrupt transmission on the transmitter/receiver, the MAT 116 may not in general monitor or measure signals on other frequencies than the shared carrier frequency F1 that the MAT 116 may be presently using for transmission. In an implementation, however, the macro RNC 120 may direct the MAT 116 to monitor signals on other frequencies and to send pilot reports on these other frequencies. The macro RNC 120 may, for example, send one or more commands to the MAT 116 via the macro access point 108 directing the MAT 116 to make interfrequency measurements. For example, for communications according to the 1x-RTT standard, the macro RNC 120 may send a Candidate Frequency Search Request message to the MAT 116 via the macro access point 108. For example, for communications according to the EV-DO Rev. A standard, a RouteUpdateRequest message may be sent to the MAT 116 via the macro access point 108.

As discussed below, in some implementations, the MAT 116 may be configured to independently monitor signals on other frequencies than the carrier frequency the MAT 116 may be presently using, e.g., the shared carrier frequency F1, and to send pilot reports on these other frequencies. That is, the MAT 116 may, on its own, make interfrequency measurements and send pilot reports to, e.g., the macro RNC 120 via the macro access point 108. For example, the MAT 116 may send pilot reports regarding other frequencies if certain signal strengths of received signals on the currently used frequency fall below one or more thresholds.

In one technique, the MAT 116 may be configured to provide pilot reports on carrier frequencies other than the shared carrier frequency F1 without, e.g., being commanded to do so by the macro RNC 120 (via the macro access point 108). As described above, the MAT 116 may receive a neighbor list that may provide information on access point pilot signals. The MAT 116 may be configured to make interfrequency measurements and provide pilot reports on other carrier frequencies based on thresholds programmed on the MAT 116. For example, the MAT 116 may "spontaneously" make measurements and may provide pilot reports on one or more of the non-shared carrier frequencies F2, F3, F4, . . . , FN to the macro RNC 120 if the SINRs of received pilot signals from any access points (including any private access points) are less than a given threshold. In an implementation, the MAT 116 may be configured to distinguish between pilot signals from macro access points, such as the macro access point 108, and pilot signals from private access points, such as the private access point 202. In an implementation, the MAT 116 may make the interfrequency measurements on one or more of the non-shared carrier frequencies F2, F3, F4, . . . , FN and may provide these pilot reports to the macro RNC 120 if the SINRs of received macro pilot signals, e.g., pilot signals from the macro access point 108, are less than a given threshold. The MAT 116 may provide these interfrequency pilot reports irrespective of, e.g., whether the SINR of pilot signals from the private access point 202 may be increasing relative to the SINR of macro pilot signals, or whether the SINR of pilot signals from the private access point 202 exceed a given threshold.

The macro RNC 120 may compare the pilot report measurements from the MAT 116 on the shared carrier frequency F1 to the pilot reports from the MAT 116 on the one or more other, dedicated macro carrier frequencies. Based on the comparison or more generally based on the pilot reports, the macro RNC 120 may (via the macro access point 108) direct the MAT 116 to move to a carrier frequency other than the shared carrier frequency F1, i.e., one of the dedicated macro frequencies F2, F3, F4, . . . , FN. The particular carrier frequency selected may be, for example, the carrier frequency that may be least utilized by macro access terminals, or the carrier frequency having the strongest signal shown from the pilot reports on the one or more non-shared carrier frequencies, although other criteria may be used.

The macro RNC 120 may (via the macro access point 108) direct the MAT 116 to move to another carrier frequency using a variety of techniques. For example, for communications according to the 1x-RTT standard, the macro RNC 120 may send an Extended Channel Assignment message to the MAT 116 via the macro access point 108. For example, for communications according to the EV-DO standard, a Traffic Channel Assignment message may be sent to the MAT 116 via the macro access point 108.

In another technique, the macro RNC 120 may periodically command the MAT 116 to measure and provide pilot reports on one or more of the non-shared carrier frequencies to the macro RNC 120 (via the macro access point 108). Based on the pilot reports regarding pilot signal strength on the shared carrier frequency F1 and the other, dedicated macro carrier frequencies, the macro RNC 120 may direct the MAT 116 to move to a carrier frequency other than the shared carrier frequency F1, i.e., one of the dedicated macro frequencies F2, F3, F4, . . . , FN. The particular carrier frequency selected may be, for example, the carrier frequency that may be least utilized by macro access terminals, or the carrier frequency having the strongest signal shown from the pilot reports on the one or more non-shared carrier frequencies, although other criteria may be used.

In other techniques, the macro RNC 120 may use pilot reports from the MAT 116 on the shared carrier frequency F1 as a proxy for determining whether or not the MAT 116 is within range of the private access point 202 and thus for whether the MAT 116 should remain on the shared carrier frequency F1 or be directed to another, dedicated macro frequency. For example, a pilot report from the MAT 116 regarding a pilot signal received from the macro access point 108 may indicate a weak or poor macro pilot signal. This may be due to interference at the MAT 116 from the private access point 202, for example, since the SINR of the macro pilot signal may decrease with more interference from the private access point 202. A small SINR of the macro pilot signal may also occur because the MAT 116 may be out of range of the macro pilot signal. This may occur whether or not the MAT 116 is in range of the private access point 202; although, if the MAT 116 is in range of the private access point 202, all macro pilot signals on the shared frequency F1 may have a weak SINR, and if the MAT 116 is not within range of the private access point 202, another macro sector may have a macro pilot signal with a better SINR. In general, the macro RNC 120 may be configured to know which carrier frequencies are dedicated macro frequencies and which carrier frequencies are shared with private access points. The macro RNC 120 may also be configured to distinguish, based on pilot reports from the MAT 116, between macro access point pilot signals and private access point pilot signals. In an implementation, the macro RNC 120 may examine the pilot report for the strength of macro pilot signal at the MAT 116. In other implementations, the macro RNC 120 may examine pilot reports from the MAT 116 for specific information regarding the strength of any private access point signal received at the MAT 116.

For example, in these other techniques, based on the pilot reports regarding signals on the shared carrier frequency F1, the macro RNC 120 may observe that the pilot signal strength of the private access point 202 may be increasing relative to the pilot signal strength(s) of other macro pilot signal(s) on the shared carrier frequency F1. Thus, the macro RNC 120 may safely conclude that the MAT 116 is experiencing interference from the private access point 202.

In a first implementation of these other techniques, in response to the macro RNC observing increasing private access point pilot signal strength at the MAT 116 on carrier F1, the macro RNC 120 may command the MAT 116 to measure and provide pilot reports on one or more of the non-shared carrier frequencies to the macro RNC 120 (via the macro access point 108). Based on the pilot reports regarding pilot signal strength on the shared carrier frequency F1 and the other, dedicated macro carrier frequencies, the macro RNC 120 may direct the MAT 116 to move to a carrier frequency other than the shared carrier frequency F1, i.e., one of the dedicated macro frequencies F2, F3, F4, . . . , FN. The particular carrier frequency selected may be, for example, the strongest signal shown from the pilot reports on the one or more non-shared carrier frequencies, although other criteria may be used.

In two other implementations of these other techniques, in response to the macro RNC observing increasing private access point pilot signal strength at the MAT 116 on carrier F1, the macro RNC 120 may not ask the MAT 116 to perform interfrequency measurements. The macro RNC 120 may instead direct the MAT 116 to move to a carrier frequency other than the shared carrier frequency F1, i.e., one of the dedicated macro frequencies F2, F3, F4, . . . , FN, without knowledge of the received pilot signals at the MAT 116 on these frequencies. In the first implementation, the macro RNC 120 may direct the MAT 116 to move to any carrier frequency other than the shared carrier frequency F1, even if the carrier frequency was another carrier frequency shared with the private access point 202. Of course, in the example shown in FIG. 5, only one shared carrier frequency F1 is assumed. In the second implementation, the macro RNC 120 may direct the MAT 116 to move to a frequency known by the macro RNC 120 to be a dedicated macro frequency. In the case of the example shown in FIG. 5, the frequencies F2, F3, F4, . . . , FN may all be dedicated macro frequencies. Thus, in these two other implementations, the macro RNC 120 may move proactively to move the MAT 116 away from the shared carrier frequency F1 based on the pilot reports before receiving, and without receiving, pilot reports from the MAT 116 on other carrier frequencies than carrier F1.

While the example shown in FIG. 5 and described above assumes that the carrier frequencies F2, F3, F4, . . . , FN may be dedicated macro carrier frequencies that no other private access point may use, the techniques described herein are more general. For example, one or more of the carrier frequencies F2, F3, F4, . . . , FN may also be shared with private access points (other than the private access point 202), and at least one carrier frequency may be a dedicated macro carrier frequency that no other private access point may use.

2. Removal of Shared Carrier Frequency from Some Carrier Lists

Figure 6:
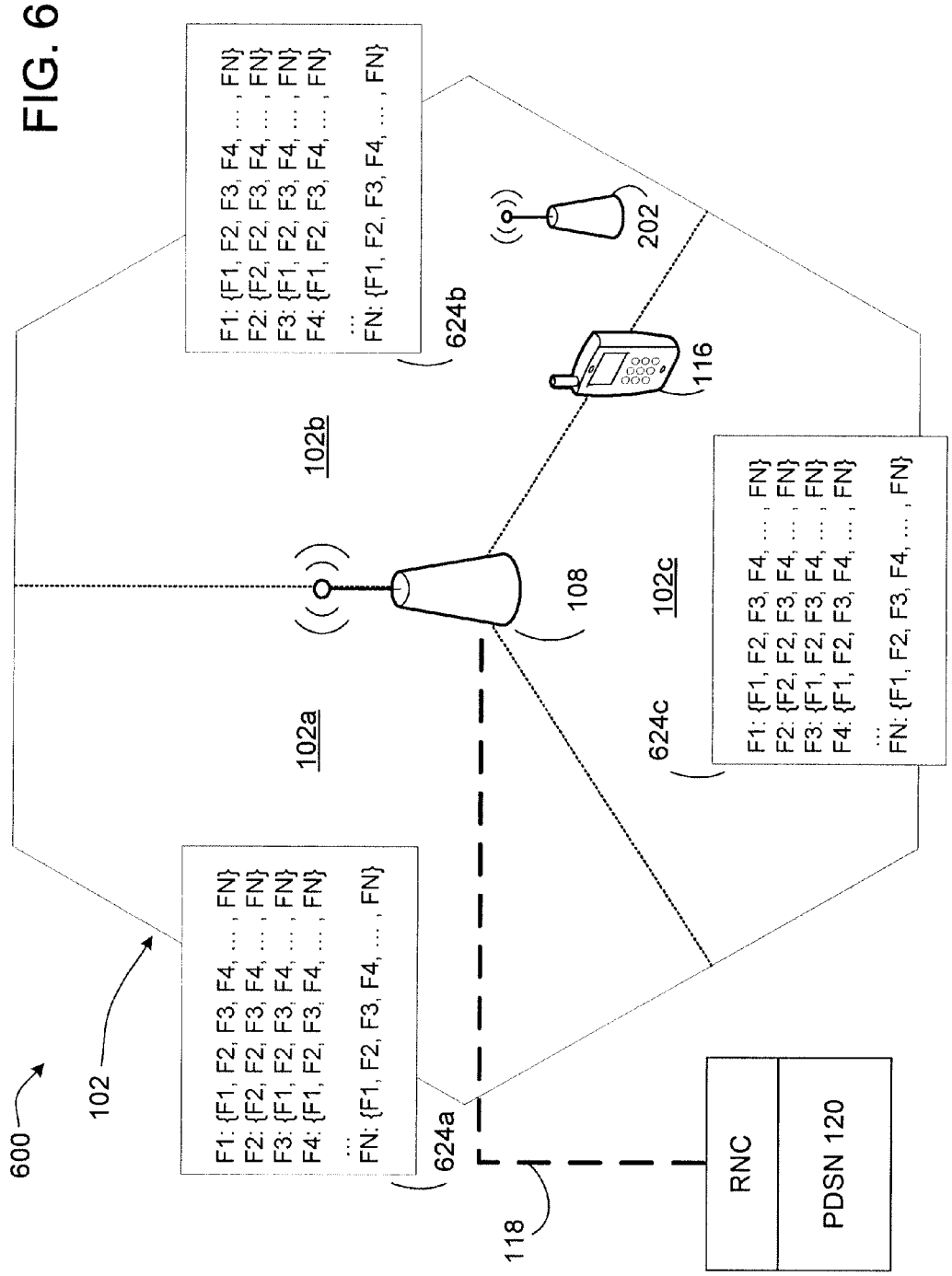

Referring to FIG. 6, this example assumes that the macro access point 108 broadcasts at N carrier frequencies, F1, F2, F3, F4, . . . , FN and that the macro access point 108 shares a carrier frequency F1 with the private access point 202 for communications. The carrier frequencies F2, F3, F4, . . . , FN may be dedicated macro carrier frequencies that the private access point 202 may not use.

The wireless network 600 of FIG. 6 includes the macro access point 108, the MAT 116, and the private access point 202, all located within the cell 102.

2.A. Idle Operational State

As described above, the idle state may include a period during which the access terminal is turned on and "idling" on a carrier frequency, but is dormant and not actively communicating with an access point (or communicating with the RAN 100 via an access point). The macro access point 108 broadcasts sets of carrier lists 624a, 624b, 624c. The macro access point 108 may receive the sets of carrier lists 624a, 624b, 624c for broadcast from the macro RNC 120 (the RNC/PDSN 120). The macro access point 108 typically broadcasts the same carrier lists in all sectors 102a, 102b, 102c of the cell 102. In general, the macro access 108 periodically broadcasts one signal per sector per carrier frequency, with one carrier list in each sector on each carrier frequency.

Assuming a shared carrier frequency F1, the macro RNC 120 may adjust one or more carrier lists broadcast by the macro access point 108 on one or more corresponding non-shared carrier frequencies, or dedicated macro carrier frequencies, i.e., one or more of the carrier frequencies F2, F3, F4, . . . , FN. The macro RNC 120 may replace the shared carrier frequency F1 in one or more carrier lists with the corresponding one or more dedicated macro carrier frequencies on which the one or more carrier lists are broadcast. For example, the macro RNC 120 may adjust a carrier list F2: {F1, F2, F3, F4, . . . , FN} that may be broadcast by the macro access point 108 on the non-shared, dedicated macro carrier frequency F2. To adjust the carrier list, the macro RNC 120 may replace the shared carrier frequency F1 in the carrier list with the carrier frequency F2, resulting in the carrier list F2: {F2, F2, F3, F4, . . . , FN} that is shown in FIG. 6. The macro RNC 120 may also adjust carrier lists instead of, or in addition to, the carrier list F2. For example, the macro RNC 120 may replace the shared carrier frequency F1 with the carrier frequency FN in the carrier list broadcast on the carrier frequency FN, resulting in the carrier list FN: {FN, F2, F3, F4, . . . , FN} (not shown in FIG. 6).

As described above, the carrier list may be a list of frequencies that may be used by the MAT 116 to determine which frequency the MAT 116 should be idling on in the idle operational state of the MAT 116. As described above, the MAT 116 may be configured to select one of the carrier frequencies from one of the N element carrier lists, such as the unadjusted carrier list F3: {F1, F2, F3, F4, . . . , FN} or the adjusted carrier list F2: {F2, F2, F3, F4, . . . , FN}, on the basis of the unique identifier of the MAT 116. That is, for a given MAT 116 having a given unique identifier, the MAT 116 may always pick the same element from an X element list, based on a hashing algorithm applied to the unique identifier.

In FIG. 6, the shared carrier frequency F1 has been replaced and is not included the carrier list broadcast by the macro access point 108 on carrier frequency F2, F2: {F2, F2, F3, F4, . . . , FN}. Therefore, if the MAT 116 receives the carrier list on carrier frequency F2, the MAT 116 may not idle on the shared carrier frequency F1 in the idle operational state of the MAT 116. Depending on the position that the MAT 116 is configured to select in an N element list, based on its hashing algorithm and its unique identifier, the MAT 116 may select one of the carrier frequencies F2, F3, F4, . . . , FN for idling. Assuming a random distribution of macro access terminals that receive the carrier list broadcast on carrier frequency F2, roughly 2/N macro access terminals may end up selecting the carrier F2 for idling. That is, those macro access terminals that, based on their hashing algorithm and their unique identifiers, end up selecting the first position, or the second position in the N element adjusted carrier list F2: {F2, F2, F3, F4, . . . , FN} will select the carrier F2 for idling.

If the MAT 116 receives one of the other carrier lists on the other carrier frequency, the MAT 116 may select one of the carrier frequencies F1, F2, F3, F4, . . . , FN for idling, so that some macro access terminals in this situation will end up idling on the shared carrier frequency F1. That is, a random distribution of macro access terminals that receive an unadjusted carrier list, such as F3: {F1, F2, F3, F4, . . . , FN} broadcast on carrier frequency F2, roughly 1/N macro access terminals may end up selecting the shared carrier F1 for idling.

A technique may be used to affect the carrier frequency distribution of idling macro access terminals for macro access terminals that turn on or boot up and use their PRL (preferred roaming list) to select an initial carrier frequency. Assume one replaced carrier list F2: {F2, F2, F3, F4, . . . , FN} on one carrier frequency F2 (broadcast by the macro access point 108 on carrier F2 in all sectors 102a, 102b, 102c), as in FIG. 6. Then, depending on the relative position of the carrier frequency F2 in the PRL (preferred roaming list) on the MAT 116, the resulting idling frequency distribution of macro access terminals using a PRL with the carrier frequency so placed may fall anywhere from one extreme to another. The higher that the carrier frequency F2 is placed in the Acquisition Table of the PRL, the more likely it is that macro access terminals such as the MAT 116 that use the PRL will select F2 as an initial carrier frequency. Any macro access terminals that receive the carrier list F2: {F2, F2, F3, F4, . . . , FN} may not end up idling on carrier frequency F1. Therefore, the higher the priority that the carrier frequency F2 has in the PRL, the more likely it is that a very high proportion of macro access terminals may never end up idling on the shared carrier frequency F1, thus affecting the idling carrier frequency distribution across idling macro access terminals.

Similarly, the lower the priority that the carrier frequency F2 has in the PRL, the more likely it is that a very high proportion of macro access terminals may receive unadjusted carrier lists on frequencies other than F2 (e.g., the carrier list F3: {F1, F2, F3, F4, . . . , FN} broadcast by the macro access terminal 108 on carrier F3) and these macro access terminals may select any carrier frequency from the list based on the corresponding hashing algorithms and unique identifiers of the macro access terminals. The resulting idling carrier frequency distribution across idling macro access terminals may tend toward being more equally distributed in terms of carrier frequencies. That is, roughly 1/N of the idling macro access terminals may end up idling on the shared carrier frequency F1.

Depending on the operational state of the MAT 116, the MAT 116 may not use the PRL to select a frequency for idling. For example, if the MAT 116 has been actively communicating using a given carrier frequency, for example, on a call, then the MAT 116 may, upon completion of the call and upon return to a dormant or idle operational state, may examine the carrier list broadcast at that given carrier frequency. Depending on the result of the hashing algorithm applied to the unique identifier of the MAT 116, and on which carrier list the MAT 116 receives, the MAT 116 may select a frequency for idling that is the same as, or that is different from, the carrier that the MAT 116 may have selected for idling if the MAT 116 was turned on or booted up and used the PRL.

In any event, certain macro access terminals, such as the MAT 116, may end up idling on the shared carrier frequency F1 in the idle operational state of the macro access terminal. Based on the sets of carrier lists 624a, 624b, 624c shown in FIG. 6, and as described above, a macro access terminal may not have ended up idling on the shared carrier frequency F1 unless the hashing algorithm of the macro access terminal caused the macro access terminal to select the first element in the carrier list. For example, if the MAT 116 is configured to select the first element in an N element carrier list, then the MAT 116 may end up idling on F1 if the MAT 116 received any of the carrier lists broadcast on the carrier frequencies F1, F3, F4, . . . , FN.

Therefore, the MAT 116 may move nearby or in range of a private access point while idling on the shared carrier frequency F1. The MAT 116 may not be authorized to use the private access point 202. As the MAT 116 moves nearby or into the range of the private access point 202, the signal (on carrier frequency F1) from the private access point 202 may be stronger than the signal from the macro access point (on carrier frequency F1). The MAT 116 may hear a broadcast message from the private access point 202 (e.g., the private access point carrier list) that has a SID/NID different from the SID/NID of the macro access point 108.

The MAT 116 may then attempt to register on the private access point 202. Since the MAT 116 may not be authorized to use the private access point 202, the private access point 202 may reject the registration message and the MAT 116. This situation may result in the MAT 116 winding up in a coverage hole on the shared carrier frequency F1 or the MAT 116 roaming on another wireless carrier's network on the carrier F1.

According to a technique, a private access point, such as the private access point 202, may be configured to redirect a macro access terminal, such as the MAT 116, that may be attempting to register with the private access point on the shared carrier frequency F1, and that is not authorized to communicate with the private access point, to another carrier frequency. The private access point may be configured to redirect a macro access terminal to a carrier frequency on which a carrier list that does not include the shared carrier frequency F1 is being broadcast by the macro access point 108. In the example of FIG. 6, the private access point 202 may be configured to redirect the MAT 116, if the MAT 116 is idling on the shared carrier frequency F1, to the carrier frequency F2 on which the carrier list F2: {F2, F2, F3, F4, . . . , FN} is being broadcast.

As described above, the macro RNC 120 may adjust a carrier list by replacing the shared carrier frequency F1 in the carrier list with the carrier frequency F2, resulting in the carrier list F2: {F2, F2, F3, F4, . . . , FN} that is shown in FIG. 6. The private access point 202, in order to know where to redirect the MAT 116 may be configured to receive the carrier frequency F2 from the macro RNC 120. The private access point 202 may be otherwise configured to know which carrier frequency to redirect the MAT 116 away from the shared carrier frequency F1.

Upon being redirected to the carrier frequency F2 by the private access point 202, the MAT 116 may receive and decode the carrier list F2: {F2, F2, F3, F4, . . . , FN} using the hashing algorithm of the MAT 116. Since the MAT 116 may not have ended up idling on the shared carrier frequency F1 unless the hashing algorithm of the macro access terminal caused the macro access terminal to select the first element in the carrier list, the MAT 116 upon decoding the carrier list broadcast on F2 may select and end up idling on the carrier frequency F2. According to these techniques, the MAT 116 may be moved away from the shared frequency F1 when the MAT 116 moves nearby or within range of the private access point 202.

Upon being redirected to the carrier frequency F2 by the private access point 202 so that the MAT 116 ultimately may idle on the carrier frequency F2, the MAT 116 may be configured to send a registration message, such as a location update message, to the macro access point 108, as described in more detail below.

Referring again to the wireless network 600 of FIG. 6, replacing the shared carrier frequency F1 by the carrier frequency F2 in the carrier list broadcast on the carrier frequency F2 (F2: {F2, F2, F3, F4, . . . , FN} together with the private access point 202 redirecting macro access terminals idling on shared carrier frequency F1 within range of the private access point 202 to the carrier frequency F2, may result in a relatively small proportion of macro access terminal idling on the shared carrier frequency F1. As the density of private access points, such as the private access point 202, may increase within the sectors 102a, 102b, 102c of cell 102, fewer macro access terminals may be left idling on the shared carrier frequency F1 beyond the range of the private access point 202. This may mean that the shared carrier frequency F1 is being under utilized for idling.

Figure 7:
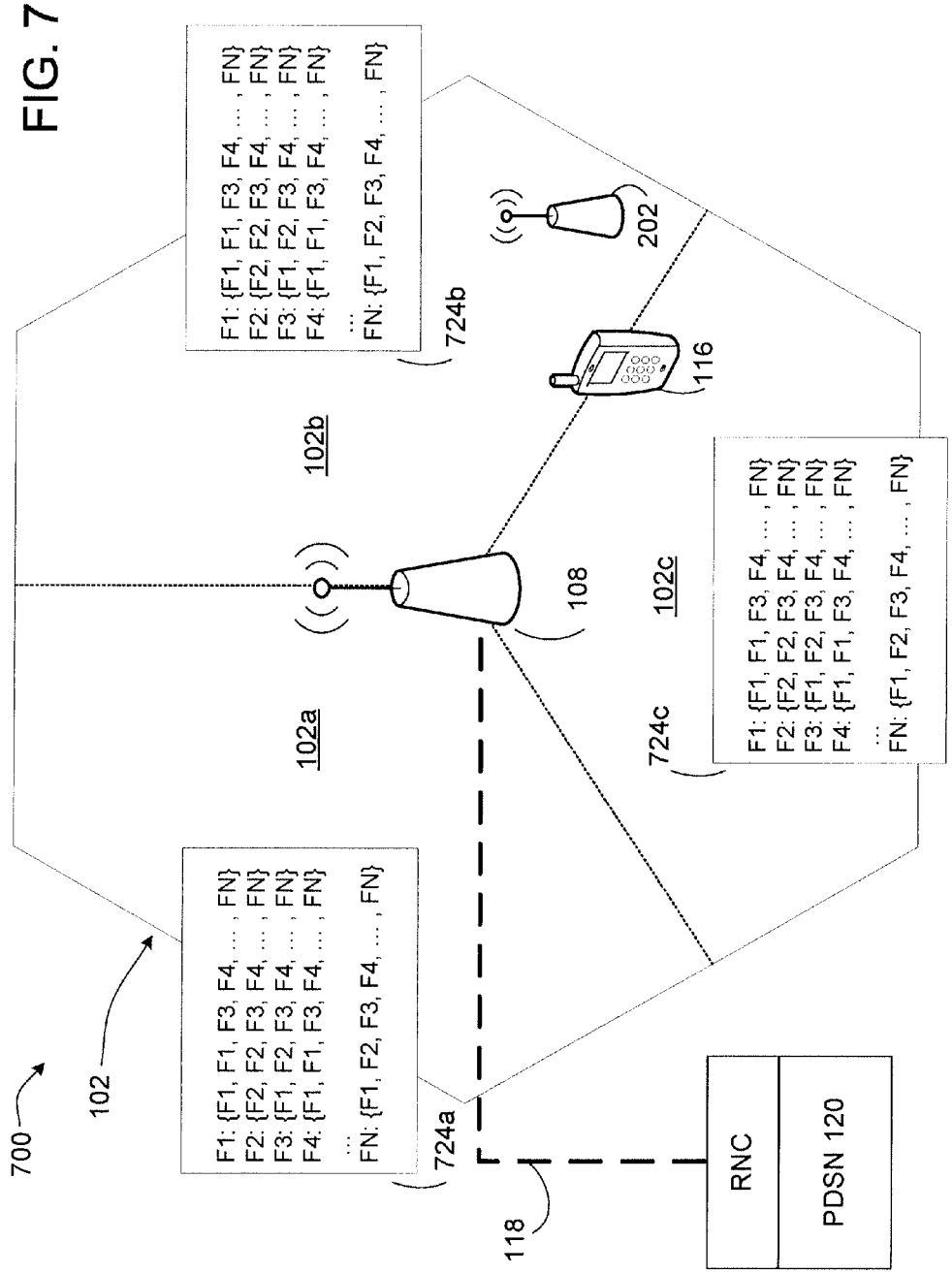

The wireless network 700 of FIG. 7 includes the macro access point 108, the MAT 116, and the private access point 202, all located within the cell 102. The macro access point 108 broadcasts sets of carrier lists 624a, 624b, 624c. The macro access point 108 may receive the sets of carrier lists 624a, 624b, 624c for broadcast from the macro RNC 120 (the RNC/PDSN 120). The macro access point 108 typically broadcasts the same carrier lists in all sectors 102a, 102b, 102c of the cell 102. In general, the macro access 108 periodically broadcasts one signal per sector per carrier frequency, with one carrier list in each sector on each carrier frequency.

According to a technique, to increase utilization of the shared carrier frequency F1 for idling by macro access terminals beyond the range of the private access point 202, the macro RNC 120 may adjust one or more carrier lists broadcast by the macro access point 108 on one or more corresponding non-shared carrier frequencies, or dedicated macro carrier frequencies, i.e., one or more of the carrier frequencies F3, F4, . . . , FN other than the carrier frequency F2. The macro RNC 120 may in general make a corresponding adjustment to the carrier list broadcast on the shared carrier frequency F1. The macro RNC 120 may replace the carrier frequency F2 with the shared carrier frequency F1 in one or more carrier lists broadcast by the macro access point 108 on one or more corresponding carrier frequencies F3, F4, . . . , FN. The macro RNC 120 may in general replace the carrier frequency F2 with the shared carrier frequency F1 in the carrier list broadcast by the macro access point 108 on the shared carrier frequency F1. For example, the macro RNC 120 may adjust a carrier list F4: {F1, F2, F3, F4, . . . , FN} that may be broadcast by the macro access point 108 on the non-shared, dedicated macro carrier frequency F4 (a dedicated macro carrier frequency other than F2). To adjust the carrier list, the macro RNC 120 may replace the carrier frequency F2 in the carrier list with the shared carrier frequency F1, resulting in the carrier list F4: {F1, F1, F3, F4, . . . , FN} that is shown in FIG. 7. The macro RNC 120 may in general then replace the carrier frequency F2 with the shared carrier frequency F1 in the carrier list broadcast on the shared carrier frequency F1, resulting in the carrier list F1: {F1, F1, F3, F4, . . . , FN} that is shown in FIG. 7. The macro RNC 120 may also adjust carrier lists instead of, or in addition to, the carrier list F4. For example, the macro RNC 120 may replace the carrier frequency F2 with the shared carrier frequency F1 in the carrier list broadcast on the carrier frequency FN, resulting in the carrier list FN: {F1, F1, F3, F4, ..., FN} (not shown in FIG. 7).

In general, assuming that the macro access point 108 broadcasts the same carrier list for a given carrier frequency in all sectors, if a carrier frequency $F_a$ is replaced by a carrier frequency $F_b$ in a carrier list broadcast by the macro access point 108 on a carrier frequency $F_c$, then the carrier frequency $F_a$ may need to be replaced by the carrier frequency $F_b$ in a carrier list broadcast by the macro access point 108 on the carrier frequency $F_b$, where a, b, and c represent any index, e.g., 0, 1, 2, 3, 4, ..., N.

In the example shown in FIG. 7, if the MAT 116 receives the carrier list F4: {F1, F1, F3, F4, ..., FN} on the carrier frequency F4, then, if the MAT 116 is configured to select the first or second element in an N element carrier list, the MAT 116 may go to the shared carrier frequency F1 to receive another carrier list. The MAT 116 may then receive the carrier list F1: {F1, F1, F3, F4, ..., FN} on the shared carrier frequency F1, and may end up idling on the shared carrier frequency F1 since in this instance the MAT 116 is configured to select the first or second element in the carrier list. This may in general increase utilization of the shared carrier frequency F1 for idling by macro access terminals beyond the range of the private access point 202

The sets of carrier lists, such as the sets 724*a*, 724*b*, 724*c*, broadcast by the macro access point 108 may be modified periodically based on any criteria, such as, for example, carrier frequency load balancing considerations, or carrier frequency allocation results and trends.

Figure 8:
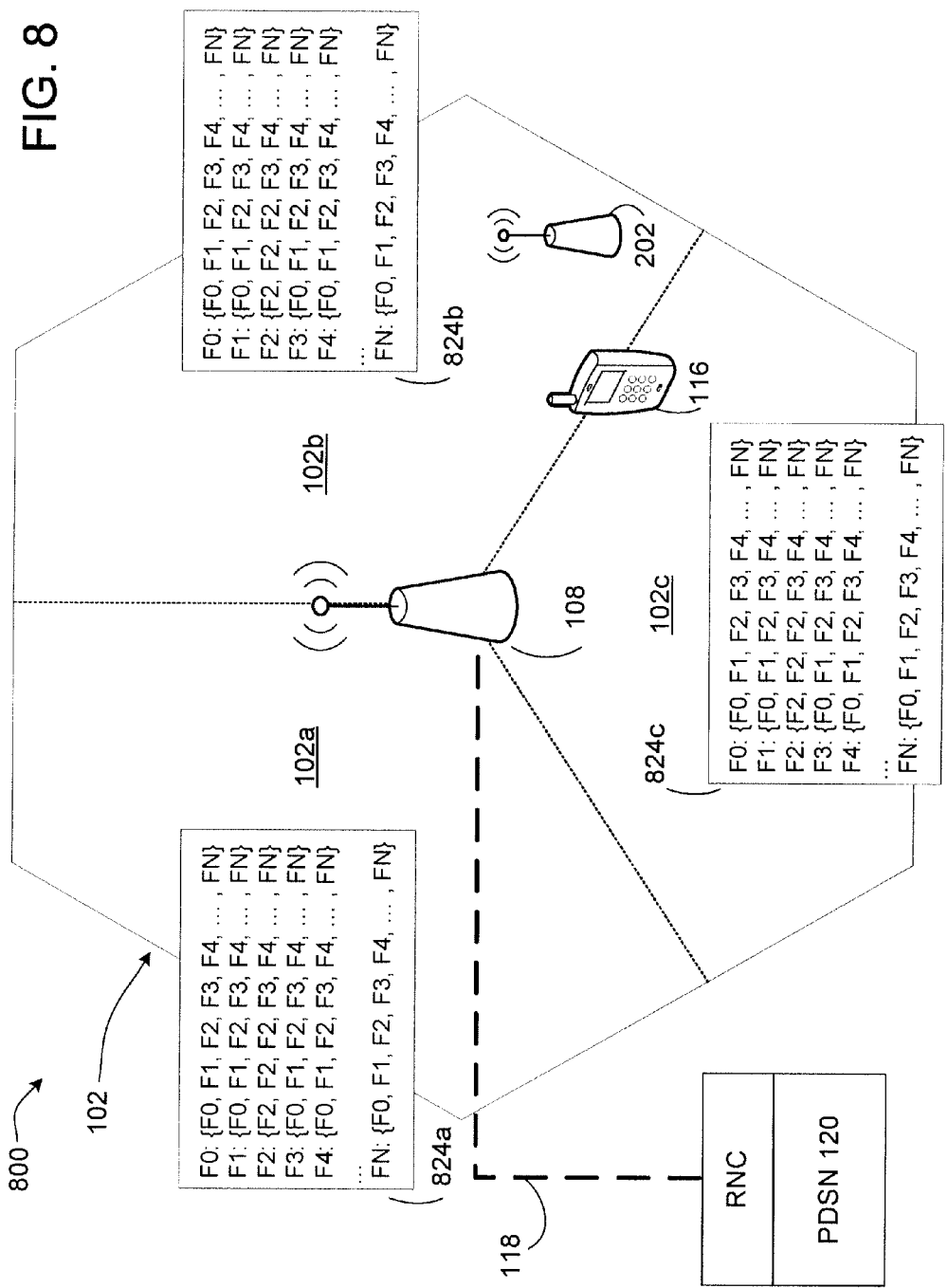
Figure 9:
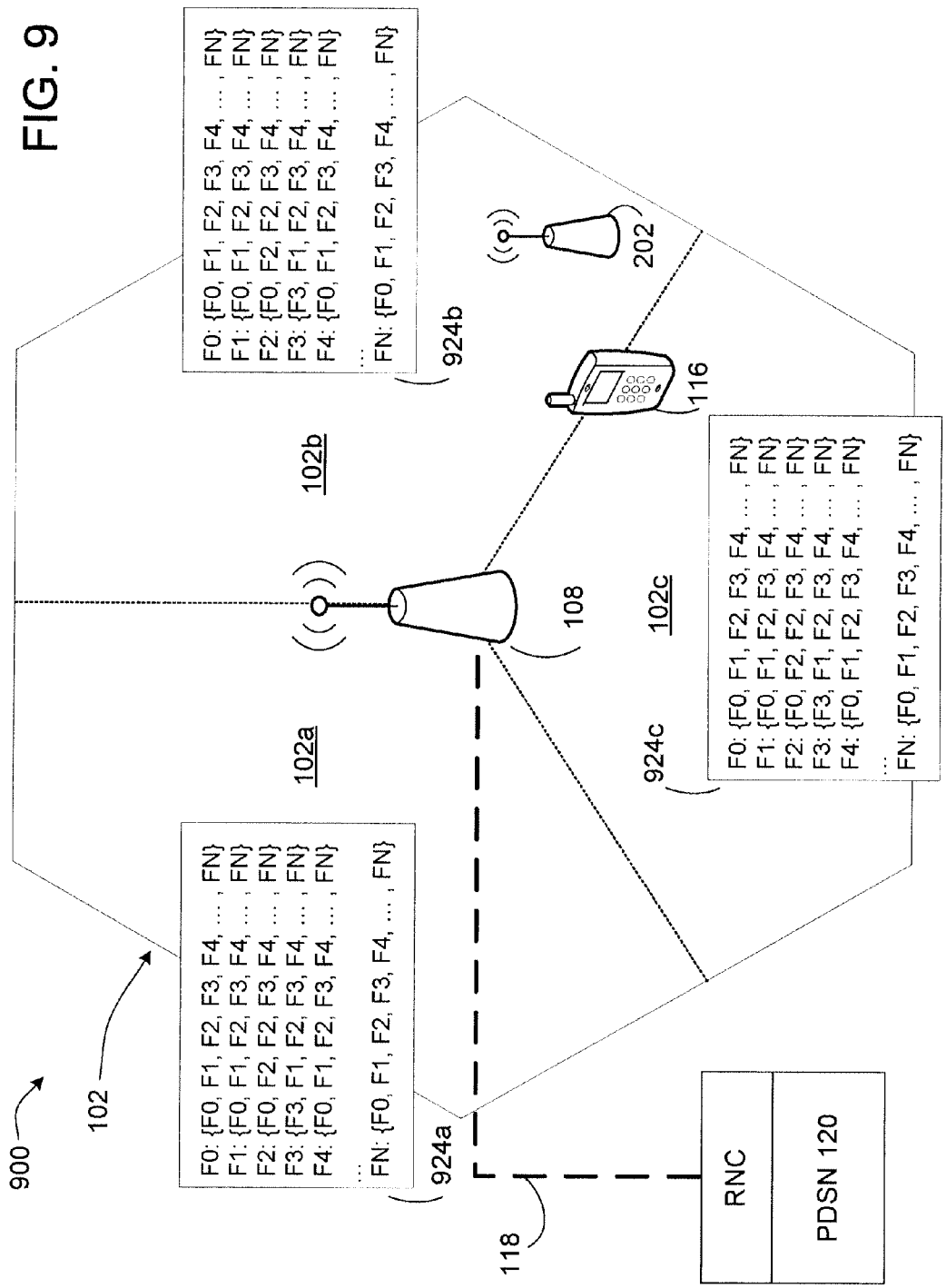

The techniques described with regard to removing a shared carrier frequency from some carrier lists may be generalized to wireless networks supporting multiple shared carrier frequencies between private access points and macro access points. FIGS. 8 and 9 show respective wireless networks 800, 900 that include the macro access point 108, the MAT 116, and the private access point 202, all located within the cell 102. Referring to FIG. 8, the macro access point 108 may receive the sets of carrier lists 824*a*, 824*b*, 824*c* for broadcast from the macro RNC 120 (the RNC/PDSN 120). Referring to FIG. 9, the macro access point 108 may receive the sets of carrier lists 824*a*, 824*b*, 824*c* for broadcast from the macro RNC 120. The macro access point 108 of FIGS. 8 and 9 typically broadcasts the same carrier lists in all sectors 102*a*, 102*b*, 102*c* of the cell 102. In general, the macro access 108 periodically broadcasts one signal per sector per carrier frequency, with one carrier list in each sector on each carrier frequency.

According to an example using the wireless networks 800, 900, the macro access point 108 and the private access point 202 share the frequencies F0 and F1 for communication. The frequencies F2, F3, F4, ..., FN are dedicated macro access point frequencies, i.e., frequencies not used by a private access point.

FIGS. 8 and 9 present two examples of how carrier lists may be adjusted by the macro RNC 120 to implement the techniques described with regard to removing a shared carrier frequency from some carrier lists.

Referring again to FIG. 8, the macro RNC 120 may remove the shared carrier frequencies F0 and F1 from one or more carrier lists broadcast by the macro access point 108 on one or more corresponding non-shared carrier frequencies, or dedicated macro carrier frequencies, i.e., one or more of the carrier frequencies F2, F3, F4, ..., FN. The macro RNC 120 may replace the shared carrier frequencies F0 and F1 in one or more carrier lists with the corresponding one or more dedicated macro carrier frequencies on which the one or more carrier lists are broadcast. For example, the macro RNC 120 may adjust a carrier list F2: {F0, F1, F2, F3, F4, ..., FN} that may be broadcast by the macro access point 108 on the non-shared, dedicated macro carrier frequency F2. To adjust the carrier list, the macro RNC 120 may replace both of the shared carrier frequencies F0 and F1 in the carrier list with the carrier frequency F2, resulting in the carrier list F2: {F2, F2, F2, F3, F4, ..., FN} that is shown in FIG. 8. The macro RNC 120 may also adjust carrier lists instead of, or in addition to, the carrier list F2. For example, the macro RNC 120 may replace both of the shared carrier frequencies F0 and F1 with the carrier frequency FN in the carrier list broadcast on the carrier frequency FN, resulting in the carrier list FN: {FN, FN, F2, F3, F4, ..., FN} (not shown in FIG. 8).

Referring again to FIG. 9, the macro RNC 120 may remove the shared carrier frequencies F0 and F1 from separate carrier lists on different non-shared carrier frequencies. For the shared carrier frequency F0, the macro RNC 120 may replace the shared carrier frequency F0 in one or more carrier lists with the corresponding one or more dedicated macro carrier frequencies on which the one or more carrier lists are broadcast. For the shared carrier frequency F1, the macro RNC 120 may also replace the shared carrier frequency F1 in one or more carrier lists with the corresponding one or more dedicated macro carrier frequencies on which the one or more carrier lists are broadcast. For example, for the shared carrier frequency F0, the macro RNC 120 may adjust a carrier list F3: {F0, F1, F2, F3, F4, ..., FN} that may be broadcast by the macro access point 108 on the non-shared, dedicated macro carrier frequency F3. To adjust the carrier list, the macro RNC 120 may replace the shared carrier frequency F0 in the carrier list with the carrier frequency F3, resulting in the carrier list F3: {F3, F1, F2, F3, F4, ..., FN} that is shown in FIG. 9. The macro RNC 120 may also replace the shared carrier frequency F0 in carrier lists instead of, or in addition to, the carrier list F3. For the shared carrier frequency F1, the macro RNC 120 may adjust a carrier list F2: {F0, F1, F2, F3, F4, ..., FN} that may be broadcast by the macro access point 108 on the non-shared, dedicated macro carrier frequency F2. To adjust the carrier list, the macro RNC 120 may replace the shared carrier frequency F1 in the carrier list with the carrier frequency F2, resulting in the carrier list F2: {F0, F2, F2, F3, F4, ..., FN} that is shown in FIG. 9. The macro RNC 120 may also replace the shared carrier frequency F1 in carrier lists instead of, or in addition to, the carrier list F2.

In the example case of two shared carrier frequencies, a private access point such as the private access point 202 may be configured to redirect a macro access terminal such as the MAT 116 that is not authorized to communicate with the private access point and that may be idling on one of the shared carrier frequencies F0 and F1 away from the frequencies F0 or F1.

In the example of FIG. 8, the private access point 202 may be configured to redirect a macro access terminal, which may be idling on either of the shared carrier frequencies F0 and F1 within range of the private access point 202, to the non-shared carrier frequency F2. At the dedicated macro carrier frequency F2, the macro access terminal may receive and decode the carrier list F2: {F2, F2, F2, F3, F4, ..., FN} and may end up idling on the carrier frequency F2.

In the example of FIG. 9, the private access point 202 may be configured to redirect a macro access terminal, which may be idling on the shared carrier frequency F0 within range of the private access point 202, to the non-shared carrier frequency F3. At the dedicated macro carrier frequency F3, the macro access terminal may receive and decode the carrier list F3: {F3, F1, F2, F3, F4, ..., FN} and may end up idling on the carrier frequency F3. Similarly, the private access point 202 may be configured to redirect a macro access terminal, which may be idling on the shared carrier frequency F1 within range of the private access point 202, to the non-shared carrier frequency F2. At the dedicated macro carrier frequency F2, the macro access terminal may receive and decode the carrier list F2: {F0, F2, F2, F3, F4, ..., FN} and may end up idling on the carrier frequency F2.

Although two shared carrier frequencies are discussed, the techniques may apply to and be generalized to more than two shared carrier frequencies. Although the multiple shared carrier frequency techniques are discussed with reference to some techniques for the idle operational state of a macro access terminal, other techniques described for the idle operation state or techniques described for operational states other than the idle operational state, e.g., the idle to active and the active operational states, may apply to and be generalized to wireless networks supporting multiple shared carrier frequencies.

2.B. Idle to Active Operational State

As described above, the idle to active state may include a period during which the access terminal transitions from a dormant, idling state to an active communicating state, such as when the access terminal is trying to make or receive a phone call. The same techniques that were described above in section "1.B. Idle to Active Operational State" for the general situation where the shared carrier frequency was not included in any carrier lists may be applied to the general situation where the shared carrier frequency is replaced in some carrier lists. That is, certain of the techniques described above in section "1.B. Idle to Active Operational State" do not assume a particular configuration of carrier lists.

There are several additional techniques or modifications on already described techniques, that may be used in the instance where, e.g., a shared carrier frequency F1 is removed from one or more carrier lists and thus the MAT 116 may, or may not, idle on the shared carrier frequency F1.

For example, in one technique, the MAT 116 may make a transition from the idle to the active state using the frequency that the MAT 116 is already idling on. Depending on the technique, or combination of techniques, used in the idle operational state of the macro access terminal, the proportion of all macro access terminals in the cell 102 idling on the shared frequency F1 may vary widely. The shared carrier frequency F1 may, for example, be somewhat under utilized from a carrier frequency load balancing perspective. For example, it may be that a great proportion of macro access terminals in the cell may be in active communication on frequencies other than the shared carrier frequency F1. Thus, this technique may result in a carrier frequency allocation that is substantially similar to that seen in the idle operational state of the macro access terminals.

In another technique described in more detail above, the macro RNC 120 of, e.g., FIG. 6 or 7, may implement a carrier frequency allocation algorithm, such as a Multi-Carrier Traffic Allocation (MCTA) algorithm, to decide which access terminals should use which carrier frequencies in the active operational state. The allocation algorithm may be based substantially on the existing relative load of the available carrier frequencies, rather than on pilot reports that the macro RNC 120 may receive from the MAT 116 via the macro access point 108. If, for example, the carrier frequency load is unbalanced, the macro RNC 120 may assign an access terminal such as the MAT 116 to the shared carrier frequency F1, notwithstanding that the macro RNC 120 may know that carrier frequency F1 is a shared frequency and thus that the MAT 116 may encounter interference from a private access point, depending on the location of the MAT 116. As described in more detail above, the macro RNC 120 may determine that an error was made in allocating the MAT 116 to the shared carrier frequency F1 and may remedy the error by transferring the MAT 116 to another frequency, e.g. F2, a dedicated macro carrier frequency.

In another technique, the macro RNC 120 of, e.g., FIG. 6 or 7, may implement a carrier frequency allocation algorithm, such as an MCTA algorithm that may, for example, be configured to exclude the shared carrier frequency F1 from consideration as a potential carrier frequency to allocate to a macro access terminal, such as the MAT 116. The MCTA algorithm may be used, for example, to select a carrier frequency for a particular carrier frequency based substantially on the existing relative load of the access terminals for all available carrier frequencies other than the shared carrier frequency F1. The macro RNC 120 may instead assign a macro access terminal such as the MAT 116 to the shared carrier frequency F1 if the macro RNC 120 received (via the macro access point 108) a request for a traffic channel from the MAT 116. The MAT 116 may request a traffic channel when the MAT 116 is trying to make a call, for example.

According to the techniques described above with reference to the idle operational state of the MAT 116 in section "2.A. Idle Operational State," the MAT 116 may generally be idling on the shared carrier frequency F1 only if the MAT 116 has not been within range of a private access point, such as the private access point 202. Otherwise, as discussed with reference to FIG. 6 or 7, for example, if the MAT 116 had been idling on the shared carrier frequency F1 within range of a private access point, the MAT 116 may have been redirected by the private access point 202 to the carrier frequency F2.

The MCTA algorithm may also be modified to perform differently with respect to the shared carrier frequency F1. For example, the algorithm may base a decision whether to allocate a particular macro access terminal to the shared carrier frequency F1 based on a combination of factors, including carrier frequency load balancing considerations as well as whether a request for a traffic channel was received from a particular macro access terminal on the shared carrier frequency F1.

The macro RNC 120 may be configured to "page" the MAT 116 (via the macro access point 108) when, for example, the macro RNC 120 receives a call intended for the MAT 116. Due to potential effects of carrier list adjustment by the macro RNC 120, the macro RNC 120 may not know which carrier frequency the MAT 116 may be idling on in the idle operational state. For example, the MAT 116 may have been idling on the shared carrier frequency F1 within range of the private access point 202. The private access point 202 may have redirected the MAT 116 to the carrier frequency F2. The macro RNC 120 may not be aware of the redirection.

Upon being redirected to the carrier frequency F2 by the private access point 202 so that the MAT 116 ultimately may idle on the carrier frequency F2, the MAT 116 may be configured to send a registration message such as a location update message to the macro access point 108. In an implementation, the registration message may be used by the macro RNC 120 to locate the MAT 116, if, for example, the macro access point 108 receives a call. That is, the idling frequency of the MAT 116 may be determined by the macro RNC 120 based on a most recently received registration message from the MAT 116. The macro RNC 120 may cause the macro access terminal to send a paging message to the MAT 116 at the carrier frequency on which the most recently received registration message was received.

If paging the MAT 116 on this frequency fails to reach the MAT 116, the macro RNC 120 may be configured to resend paging messages on the carrier frequencies F1 and F2. The carrier frequencies F1 and F2 are selected by the macro RNC 120 for paging, since F1 is the shared carrier frequency and F2 is the carrier frequency that the MAT 116 would have been redirected to if the MAT had come in range of the private access point 202 while idling on F1. If paging the MAT 116 on the frequencies F1 and F2 fails to reach the MAT 116, the macro RNC 120 may be configured to flood all carrier frequencies supported by the macro access point 108 with paging messages.

2.C. Active Operational State

As described above, the active state may include a period during which the access terminal is actively communicating with an access point (or communicating with the RAN 100 via an access point). The same techniques that were described above in section "1.C. Active Operational State" for the general situation where the shared carrier frequency was not included in any carrier lists may be applied to the general situation where the shared carrier frequency is replaced in some carrier lists. That is, the techniques described above in section "1.C. Active Operational State" do not assume a particular configuration of carrier lists. Rather, the techniques assume a MAT 116 that is in the active operational state on the shared carrier frequency F1.

As described above in section "1.C. Active Operational State," there are several possible techniques that may be used in the active operational state of the MAT 116 to, for example, move the MAT 116 away from the shared frequency F1 when one or more pilot reports indicate that the MAT 116 may be nearby or within range of the private access point 202 and experiencing interference from the private access point 202. In some implementations, as described above, the techniques may involve the macro RNC 120 examining pilot reports from the MAT 116 on one or more carrier frequencies other than the shared carrier frequency F1. In other implementations, as described above, the techniques may involve the macro RNC 120 using pilot reports from the MAT 116 on the shared carrier frequency F1 without the MAT 116 making measurements and providing pilot reports on other carrier frequencies than the shared carrier frequency F1.

The macro RNC 120 may (via the macro access point 108) direct the MAT 116 to move to another carrier frequency using a variety of techniques. For example, for communications according to the 1x-RTT standard, the macro RNC 120 may send an Extended Channel Assignment message to the MAT 116 via the macro access point 108. For example, for communications according to the EV-DO Rev. A standard, a Traffic Channel Assignment message may be sent to the MAT 116 via the macro access point 108.

Figure 10:
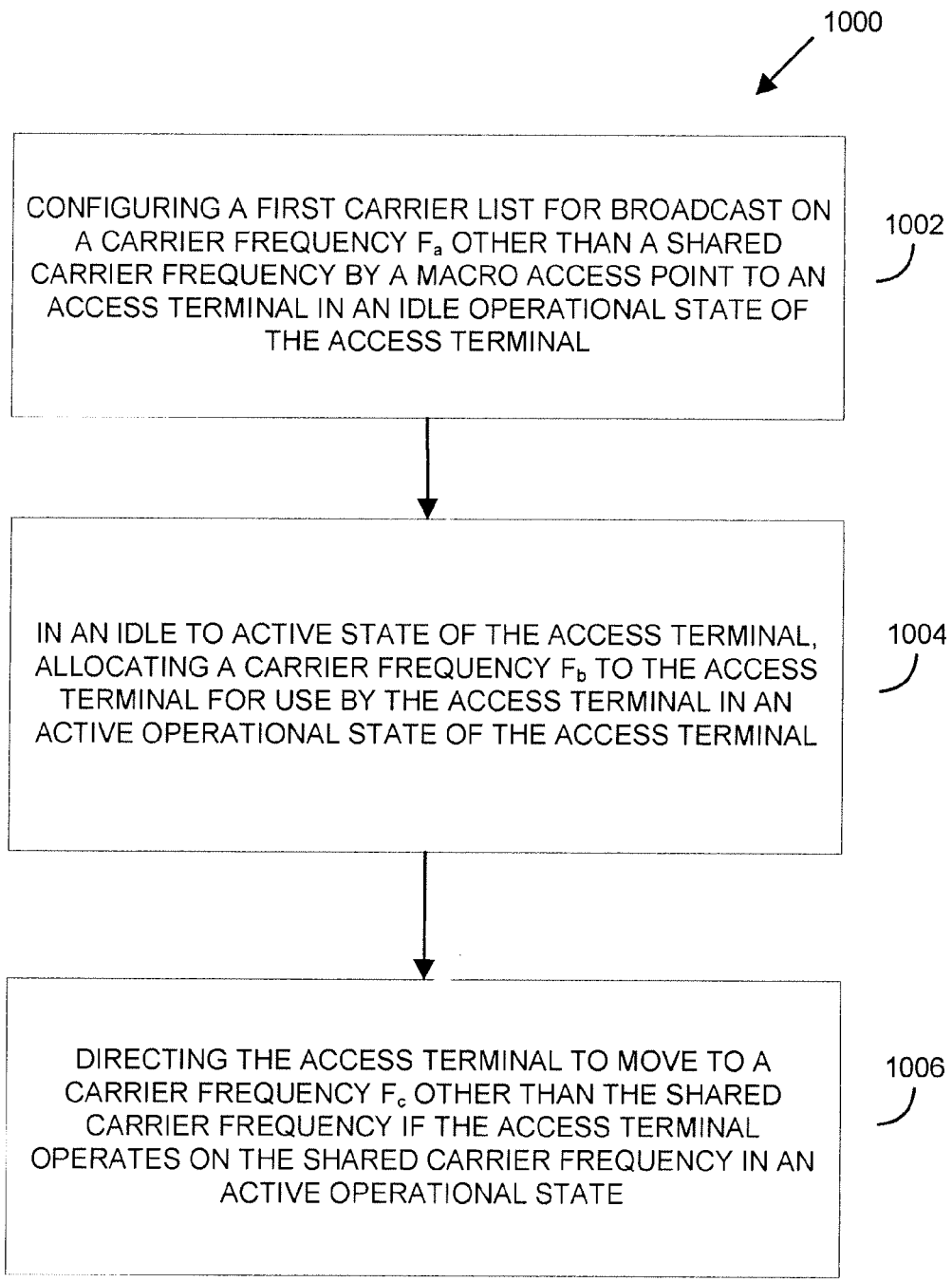
FIG. 10 is a flow diagram of an example process.

FIG. 10 illustrates an example process 1000 that may be performed by a macro controller, such as the macro RNC 120 of, e.g., FIG. 5 or 6, to mitigate interference between a private access point, such as the private access point 202, and an access terminal, such as the MAT 116, in a radio access network. The MAT 116 may have an idle operational state, an idle to active operational state, and an idle operational state. The process may configure (1002) a first carrier list for broadcast on a carrier frequency $F_a$ by a macro access point, such as the macro access point 108, to the access terminal in an idle operational state of the access terminal. The carrier frequency $F_a$ may be a carrier frequency other than a shared carrier frequency; i.e., $F_a$ may be a dedicated macro access point carrier frequency. In an idle to active state of the access terminal, the process may allocate (1004) a carrier frequency $F_b$ to the access terminal for use by the access terminal in an active operational state of the access terminal. The process may, in certain circumstances, direct (1006) the access terminal to move to a carrier frequency $F_c$ other than a shared carrier frequency if the access terminal operates on the shared carrier frequency in an active operational state. Note that if the carrier frequencies $F_a$ and $F_c$ are non-shared carrier frequencies, these frequencies would be the same carrier frequency in a two carrier frequency system that included one shared carrier frequency. The carrier frequency $F_b$ may, but need not be, a shared carrier frequency.

In an example system based on the process 1000, the private access point 202 may use a shared carrier frequency F1 that may be shared with the macro access point 108. That is, the private access point 202 and the macro access point 108 both may use the shared carrier frequency F1. The MAT 116 may be configured to communicate with the macro access point 108 and the MAT 116 may not be authorized to communicate with the private access point 202. Generally, N carrier frequencies may be used by the macro access point 108, where N≧2. The macro RNC 120 may direct the MAT 116 to move to a first carrier frequency other than the shared carrier frequency F1 if the MAT 116 operates on the shared carrier frequency F1 in the active operational state of the MAT 116. The macro RNC 120 may configure a first carrier list for broadcast on a second carrier frequency F2 by the macro access point 108 to the MAT 116 in the idle operational state of the MAT 116. The first carrier list broadcast on F2 may not include the shared carrier frequency F1, as shown in, e.g., FIG. 5 (F2: {F2, F3, F4, . . . , FN}) or FIG. 6 (F2: {F2, F2, F3, F4, . . . , FN}).

Configuring the first carrier list for broadcast by the macro access point 108 to the MAT 116 may include configuring a set of N carrier lists for broadcast by the macro access point (see, e.g., the set 524*a* of FIG. 5 or the set 624*a* of FIG. 6). Each particular carrier list of the set of N carrier lists may be broadcast by the macro access point on a corresponding particular different carrier frequency of the N carrier frequencies used by the macro access point. For example, the set of carrier lists 524*a* of FIG. 5 shows N carrier lists, with the carrier list F1 being broadcast on the corresponding carrier frequency F1, and so on, to the carrier list FN being broadcast on the corresponding carrier frequency FN. The N carrier frequencies may include the shared carrier frequency F1 and the first carrier frequency, that is, the frequency to which the macro RNC 120 may direct the MAT 116 to move to from the shared carrier frequency F1 in the active operational mode of the MAT 116. The set of N carrier lists may include the first carrier list (which may be broadcast on the carrier frequency F2) and a second carrier list that may be broadcast by the macro access point 108 on the shared carrier frequency F1.

The MAT 116 may be configured to select an idling carrier frequency from a received carrier list of the set of N carrier lists based on an algorithm, such as a hashing algorithm applied to a unique identifier of the MAT 116. The MAT 116 may receive the received carrier list from the macro access point 108. The MAT 116 may be configured to idle on the idling carrier frequency in the idle operational state of the MAT 116.

In an implementation, all carrier lists of the set of N carrier lists may include no more than N−1 carrier list elements, as shown in, for example, FIG. 5. The N−1 carrier list elements may correspond to certain carrier frequencies of the N carrier frequencies. All carrier lists of the set of N carrier lists may not include the shared carrier frequency as one of the N−1 carrier list elements. For example, the three sets of N carrier lists 524a, 524b, 524c of FIG. 5 do not include the shared carrier frequency F1 in the carrier lists.

In an implementation, all carrier lists of the set of N carrier lists may include N carrier list elements, as shown in, for example, FIG. 6 or FIG. 7. The N carrier list elements may correspond to certain carrier frequencies of the N carrier frequencies. Different carrier lists of the set of N carrier lists may be permitted to have different elements from one another. For example, in the set of N carrier lists 624a in FIG. 6, the carrier list F1: {F1, F2, F3, F4, ..., FN} has different elements from the carrier list F2: {F2, F2, F3, F4, ..., FN}. The second carrier list (which may be broadcast on the shared carrier frequency F1) may include the shared carrier frequency F1 as one of the N carrier list elements, as seen in the carrier list F1: {F1, F2, F3, F4, ..., FN} of FIG. 6 and the carrier list F1: {F1, F1, F3, F4, ..., FN} of FIG. 7.

The macro RNC 120, in configuring the set of N carrier lists for broadcast by the macro access point 108, may remove the shared carrier frequency F1 from the first carrier list and may replace the shared carrier frequency F1 in the first carrier list with the second carrier frequency F2 on which the first carrier list may be broadcast by the macro access point 108, so that the second carrier frequency F2 appears at least two times in the first carrier list. This is shown in the carrier list F2: {F2, F2, F3. F4, ..., FN} of FIGS. 6 and 7.

The macro RNC 120, in configuring the set of N carrier lists for broadcast by the macro access point 108, may remove the second carrier frequency F2 from a third carrier list of the set of N carrier lists and may remove the second carrier frequency F2 from the second carrier list (which may be broadcast on the shared carrier frequency F1). The macro RNC 120 may replace the second carrier frequency F2 in the third carrier list and the second carrier list with the shared carrier frequency, so that, as shown in FIG. 7, for example, the shared carrier frequency may appear at least two times in the third carrier list (carrier list F4: {F1, F1, F3, F4, ..., FN}) and the second carrier list (carrier list F1: {F1, F1, F3, F4, ..., FN}).

The private access point 202 may be configured to direct the MAT 116 to move to the second carrier frequency F2 if the private access point 202 determines that the MAT 116 is within range of the private access point 202 on the shared carrier frequency F1 in the idle operational state of the MAT 116. The private access point 202 may be configured to direct the MAT 116 to move to the second carrier frequency based on the replacement of the shared carrier frequency F1 in the first carrier list (e.g., F2: {F2, F2, F3, F4, ..., FN} in FIGS. 6 and 7) with the second carrier frequency F2.

The macro RNC 120 may cause the macro access point 108 to send a paging message to the MAT 116 based on a registration message received from the MAT 116. The MAT 116 may be configured to send the registration message to the macro access point 108 in response to the MAT 116 being directed by the private access point 202 to move to the second carrier frequency F2. The macro RNC 120 may cause the macro access point 108 to send a paging message to the MAT 116 on at least the shared carrier frequency F1 and the second carrier frequency of the N carrier frequencies.

As described above, the macro RNC 120, in configuring the set of N carrier lists for broadcast by the macro access point 108, may remove the shared carrier frequency F1 from the first carrier list and may replace the shared carrier frequency F1 in the first carrier list with the second carrier frequency F2 on which the first carrier list may be broadcast by the macro access point 108, so that the second carrier frequency F2 appears at least two times in the first carrier list. This is shown in the carrier list F2: {F2, F2, F3. F4, ..., FN} of FIGS. 6 and 7. The macro RNC 120 may configure a roaming list, such as a preferred roaming list (PRL) for a set of access terminals. The set of access terminals may include the MAT 116. The macro RNC 120 may assign the second carrier frequency F2 a reduced priority in the roaming list so that the set of access terminals is less likely to receive the first carrier list (e.g., F2: {F2, F2, F3. F4, ..., FN} of FIGS. 6 and 7) from the macro access point 108.

In the idle to active state of the MAT 116, the macro RNC 120 may allocate a fourth carrier frequency to the MAT 116 for use by the MAT 116 in the active operational state of the MAT 116. The fourth carrier frequency may be any frequency of N carrier frequencies, including the shared carrier frequency F1.

In the idle to active operational state of the MAT 116, the macro RNC 120 may allocate the fourth carrier frequency to the MAT 116 based on a carrier frequency allocation algorithm. The carrier frequency allocation algorithm may be based on the carrier frequency utilization of a set of access terminals communicating with the macro access point 108 at corresponding carrier frequencies of the N carrier frequencies. If the fourth carrier frequency that may be allocated to the MAT 116 by the macro RNC 120 is the shared carrier frequency F1, then, the macro RNC 120 may analyze a report, such as a pilot report, sent by the MAT 116 on the shared carrier frequency F1. The report may include measurements of one or more signals, such as pilot signals, received by the MAT 116 on the shared carrier frequency F1. If the fourth carrier frequency that may be allocated to the MAT 116 by the macro RNC 120 includes the shared carrier frequency F1, then, the macro RNC 120 may direct the MAT 116 to move to the first carrier frequency other than the shared carrier frequency F1 if the report indicates that the MAT 116 is likely to be within range of the private access point 202. The first carrier frequency is the carrier frequency to which the macro RNC 120 may direct the MAT 116 to move to from the shared carrier frequency F1 in the active operational mode of the MAT 116.

In the idle to active operational state of the MAT 116, the macro RNC 120 may receive (e.g., via the macro access point 108) a request for a traffic channel from the MAT 116 on the shared carrier frequency F1, and may allocate the fourth carrier frequency to the MAT 116 based on the request. The fourth carrier frequency may be the shared carrier frequency F1. The macro RNC 120 may allocate the fourth carrier frequency to the MAT 116 according to an idling carrier frequency used by the MAT 116 in the idle operational state of the MAT 116.

In the idle to active operational state of the MAT 116, the macro RNC 120 may receive (e.g., via the macro access point 108) one or more reports, such as one or more pilot reports, from the MAT 116. The MAT 116 may be operating on a fifth carrier frequency other than the shared carrier frequency F1 in the idle operational state. The fifth carrier frequency may be a dedicated macro frequency and the private access point 202 may not use the fifth carrier frequency. The macro RNC 120 may determine whether to allocate the shared carrier frequency F1 to the MAT 116 based on at least one report of the one or more reports received from the MAT 116. The shared carrier frequency F1 may be allocated to the MAT 116 if the at least one report of the one or more reports received from the MAT 116 indicates that the MAT 116 is unlikely to be within range of the private access point 202. The one or more reports may include a first report sent by the MAT 116 on the shared carrier frequency F1. The first report may include measurements of one or more signals received by the MAT 116 on the shared carrier frequency F1. The macro RNC 120 may request that the MAT 116 send the first report. The one or more reports may include a second report sent by the MAT 116 on the fifth carrier frequency. The second report may include measurements of one or more signals received by the MAT 116 on the fifth carrier frequency. The one or more reports may further include additional reports, such as additional pilot reports, sent by the MAT 116. The additional reports may include measurements of one or more signals received by the MAT 116 on one or more carrier frequencies of the N frequencies other than the shared carrier frequency F1 and the fifth carrier frequency. The private access point 202 may not use the one or more carrier frequencies. The macro RNC 120 may request that the MAT 116 send the additional reports. The macro RNC 120 may analyze the first report, and request that the MAT 116 send the additional reports responsively to analysis of the first report.

As described above, the macro RNC 120 may direct the MAT 116 to move to a first carrier frequency other than the shared carrier frequency F1 if the MAT 116 operates on the shared carrier frequency F1 in the active operational state of the MAT 116.

In the active operational state of the MAT 116, the macro RNC 120 may determine whether the MAT 116 is within range of the private access point 202 in the active operational state of the MAT 116. The macro RNC 120 may direct the MAT 116 to move to the first carrier frequency other than the shared carrier frequency F1 if the MAT 116 is determined to be within range of the private access point 202 on the shared carrier frequency F1. The private access point 202 may not use the first carrier frequency.

In the active operational state of the MAT 116, the macro RNC may receive one or more reports, such as one or more pilot reports, from the MAT 116. The MAT 116 may be operating on the shared carrier frequency F1 in the active operational state. The macro RNC 120 may direct the MAT 116 to move to the first carrier frequency other than the shared carrier frequency F1 based on at least one report of the one or more reports received from the MAT 116. The macro RNC 120 may direct the MAT 116 to move to the first carrier frequency other than the shared carrier frequency F1 if the at least one report of the one or more reports received from the MAT 116 indicates that the MAT 116 is likely to be within range of the private access point 202. The one or more reports may include a first report sent by the MAT 116 on the shared carrier frequency F1. The first report may include measurements of one or more signals received by the MAT 116 on the shared carrier frequency F1. The macro RNC 120 may analyze the first report. The macro RNC 120 may direct the MAT 116 to move to the first carrier frequency other than the shared carrier frequency F1 based on the first report only, without the macro RNC 120 having knowledge of signal measurements on carrier frequencies of the N frequencies other than the shared carrier frequency F1. The first carrier frequency may be known to the macro RNC 120 to be a dedicated macro carrier frequency. The private access point 202 may not use the first carrier frequency. The one or more reports may further include additional reports, such as additional pilot reports, sent by the MAT 116. The additional reports may include measurements of one or more signals, such as pilot signals, received by the MAT 116 on one or more carrier frequencies of the N frequencies other than the shared carrier frequency F1. The private access point 202 may not use the one or more carrier frequencies. The MAT 116 may be configured to send the additional reports independently of being requested to do so by the macro RNC 120. The MAT 116 may be configured to compare measurements of received signals on the shared carrier frequency F1 to one or more thresholds and to send the additional reports based a result of the comparison. The macro RNC 120 may request that the MAT 116 send the additional reports to the macro RNC 120. The macro RNC 120 may analyze the first report, and may request that the MAT 116 send the additional reports responsively to analysis of the first report. The macro RNC 120 may periodically request that the MAT 116 send the additional reports.

The example system may include two shared carrier frequencies, F0 and F1. The macro RNC 120 may configure an additional carrier list for broadcast by the macro access point 108 so that a set of N+1 carrier lists may be configured for broadcast by the macro access point 108, as shown, for example, in FIGS. 8 and 9. All carrier lists of the set of N+1 carrier lists may include N+1 carrier list elements. The second shared carrier frequency F0 may be an additional frequency used by the macro access point 108 so that N+1 carrier frequencies may be used by the macro access point 108. A second private access point, such as the private access point 212 of FIG. 2, and the macro access point 108 both may use the second shared carrier frequency F0.

The macro RNC 120, in configuring the set of N+1 carrier lists for broadcast by the macro access point 108, may remove the shared carrier frequency F1 from the first carrier list and may replace the shared carrier frequency F1 in the first carrier list with the second carrier frequency F2 on which the first carrier list may be broadcast by the macro access point 108, so that the second carrier frequency F2 appears at least two times in the first carrier list. The macro RNC 120 may also remove the second shared carrier frequency F0 from the first carrier list. The macro RNC 120 may replace the second shared carrier frequency F0 in the first carrier list with the second carrier frequency F2 on which the first carrier list may be broadcast by the macro access point 108, so that the second carrier frequency F2 appears at least three times in the first carrier list. This is shown in the carrier list F2: {F2, F2, F2, F3, F4, . . . , FN} of FIG. 8.

The macro RNC 120, in configuring the set of N carrier lists for broadcast by the macro access point 108, may remove the shared carrier frequency F1 from the first carrier list and may replace the shared carrier frequency F1 in the first carrier list with the second carrier frequency F2 on which the first carrier list may be broadcast by the macro access point 108, so that the second carrier frequency F2 appears at least two times in the first carrier list. This is shown in the carrier list F2: {F0, F2, F2, F3, F4, . . . , FN} of FIG. 9. The macro RNC 120 may also remove the second shared carrier frequency F0 from a third carrier list (which may be broadcast on a third carrier frequency F3, for example) of the set of N+1 carrier lists. The macro RNC 120 may replace the second shared carrier frequency F0 in the third carrier list with the third carrier frequency F3 on which the third carrier list may be broadcast by the macro access point 108, so that the third carrier frequency F3 appears at least two times in the third carrier list. This is shown in the carrier list F3: {F3, F1, F2, F3, F4, . . . , FN}.

While the examples shown in FIGS. 6 and 7 and described above assume that the carrier frequencies F2, F3, F4, . . . , FN may be dedicated macro carrier frequencies that no other private access point may use, the techniques described herein are more general. For example, one or more of the carrier frequencies F2, F3, F4, . . . , FN may also be shared with private access points (other than the private access point 202).

While the techniques described herein in some cases refer to a single carrier frequency shared by a private access point and a macro access point, the techniques apply to one or more shared carrier frequencies. For example, a private access point may use a carrier frequency F0 that may be shared with a macro access point, and one or more other private access points may use another carrier frequency F1 that may be shared with the macro access point. In general, the techniques described herein may be applied to more than one shared carrier frequency.

Although the techniques described herein employ the 1-xRTT and EV-DO air interface standards, the techniques may be applicable to other air interface technologies.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

All or part of the processes can be implemented as a computer program product, e.g., a computer program tangibly embodied in one or more information carriers, e.g., in one or more machine-readable storage media or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, one or more processors will receive instructions and data from a read-only memory or a random access memory or both. The essential elements of a computer are one or more processors for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Actions associated with the processes can be rearranged and/or one or more such action can be omitted to achieve the same, or similar, results to those described herein.

Elements of different implementations may be combined to form implementations not specifically described herein.

In using the term "may," it is understood to mean "could, but not necessarily must."

In using the terms "first," "second," "third," "fourth," and "fifth," and the like in the claims, the terms are intended to differentiate features and elements from one another for purposes of the claim language. The terms should not be read to require that the identified number of elements be present. For example, referring to the "fifth" carrier frequency does not necessarily mean that five carrier frequencies are required in the claim. For example, depending on the implementations, the "fifth" carrier frequency may include the "second" carrier frequency.

Numerous uses of and departures from the specific system and processes disclosed herein may be made without departing from the inventive concepts. Consequently, the invention is to be construed as embracing each and every novel feature and novel combination of features disclosed herein and limited only by the spirit and scope of the appended claims.

What is claimed is:

1. A method of mitigating interference between a private access point and an access terminal in a radio access network, the private access point using a shared carrier frequency that is shared with a macro access point, the access terminal having an idle operational state and an active operational state, the method comprising:

directing the access terminal to move to a first carrier frequency other than the shared carrier frequency if the access terminal operates on the shared carrier frequency in the active operational state;

wherein the access terminal is configured to communicate with the macro access point and the access terminal is not authorized to communicate with the private access point;

wherein N carrier frequencies are used by the macro access point; and wherein $N \geq 2$.

2. The method of claim 1, further comprising:
configuring a first carrier list for broadcast on a second carrier frequency other than the shared carrier frequency by the macro access point to the access terminal in the idle operational state of the access terminal.

3. The method of claim 2, wherein the first carrier list does not include the shared carrier frequency.

4. The method of claim 2, wherein configuring the first carrier list for broadcast by the macro access point to the access terminal in the idle operational state of the access terminal comprises:
configuring a set of N carrier lists for broadcast by the macro access point;
wherein each particular carrier list of the set of N carrier lists is broadcast by the macro access point on a corresponding particular different carrier frequency of the N carrier frequencies used by the macro access point;
wherein the N carrier frequencies comprise the shared carrier frequency and the first carrier frequency; and
wherein the set of N carrier lists comprises the first carrier list and a second carrier list that is broadcast by the macro access point on the shared carrier frequency.

5. The method of claim 4, wherein the access terminal is configured to select an idling carrier frequency from a received carrier list of the set of N carrier lists based on an algorithm;
wherein the access terminal receives the received carrier list from the macro access point;
wherein the access terminal is configured to idle on the idling carrier frequency in the idle operational state of the access terminal.

6. The method of claim 4, wherein all carrier lists of the set of N carrier lists comprise no more than N−1 carrier list elements; wherein the N−1 carrier list elements correspond to certain carrier frequencies of the N carrier frequencies; and
wherein all carrier lists of the set of N carrier lists do not include the shared carrier frequency as one of the N−1 carrier list elements.

7. The method of claim 4, wherein all carrier lists of the set of N carrier lists comprise N carrier list elements; wherein the N carrier list elements correspond to certain carrier frequencies of the N carrier frequencies;
wherein different carrier lists of the set of N carrier lists are permitted to have different elements from one another; and
wherein the second carrier list comprises the shared carrier frequency as one of the N carrier list elements.

8. The method of claim 7, wherein configuring the set of N carrier lists for broadcast by the macro access point comprises:
removing the shared carrier frequency from the first carrier list; and
replacing the shared carrier frequency in the first carrier list with the second carrier frequency on which the first carrier list is broadcast by the macro access point, so that the second carrier frequency appears at least two times in the first carrier list.

9. The method of claim 8, wherein configuring the set of N carrier lists for broadcast by the macro access point further comprises:
removing the second carrier frequency from a third carrier list of the set of N carrier lists;
removing the second carrier frequency from the second carrier list; and
replacing the second carrier frequency in the third carrier list and the second carrier list with the shared carrier frequency, so that the shared carrier frequency appears at least two times in the third carrier list and the second carrier list.

10. The method of claim 8, wherein the private access point is configured to direct the access terminal to move to the second carrier frequency if the private access point determines that the access terminal is within range of the private access point on the shared carrier frequency in the idle operational state of the access terminal.

11. The method of claim 10, wherein the private access point is configured to direct the access terminal to move to the second carrier frequency based on the replacement of the shared carrier frequency in the first carrier list with the second carrier frequency.

12. The method of claim 10, further comprising:
sending a paging message to the access terminal based on a registration message received from the access terminal;
wherein the access terminal is configured to send the registration message to the macro access point in response to the access terminal being directed by the private access point to move to the second carrier frequency.

13. The method of claim 10, further comprising:
sending a paging message to the access terminal on at least the shared carrier frequency and the second carrier frequency of the N carrier frequencies.

14. The method of claim 8, further comprising:
configuring a roaming list for a set of access terminals;
wherein the set of access terminals comprises the access terminal; and
assigning the second carrier frequency a reduced priority in the roaming list so that the set of access terminals is less likely to receive the first carrier list from the macro access point.

15. The method of claim 8, further comprising:
configuring an additional carrier list for broadcast by the macro access point so that a set of N+1 carrier lists is configured for broadcast by the macro access point;
wherein the set of N+1 carrier lists comprises the set of N carrier lists;
wherein all carrier lists of the set of N+1 carrier lists comprise N+1 carrier list elements;
wherein a second shared carrier frequency is an additional frequency used by the macro access point so that N+1 carrier frequencies are used by the macro access point;
wherein the N+1 carrier frequencies comprise the N carrier frequencies;
removing the second shared carrier frequency from the first carrier list;
wherein a second private access point and the macro access point both use the second shared carrier frequency; and
replacing the second shared carrier frequency in the first carrier list with the second carrier frequency on which the first carrier list is broadcast by the macro access point, so that the second carrier frequency appears at least three times in the first carrier list.

16. The method of claim 8, further comprising:
configuring an additional carrier list for broadcast by the macro access point so that a set of N+1 carrier lists is configured for broadcast by the macro access point;
wherein the set of N+1 carrier lists comprises the set of N carrier lists;
wherein all carrier lists of the set of N+1 carrier lists comprise N+1 carrier list elements;
wherein a second shared carrier frequency is an additional frequency used by the macro access point so that N+1 carrier frequencies are used by the macro access point;

wherein the N+1 carrier frequencies comprise the N carrier frequencies;

removing the second shared carrier frequency from a third carrier list of the set of N+1 carrier lists;

wherein a second private access point and the macro access point both use the second shared carrier frequency; and replacing the second shared carrier frequency in the third carrier list with a third carrier frequency on which the third carrier list is broadcast by the macro access point, so that the second carrier frequency appears at least two times in the third carrier list.

17. The method of claim 2, further comprising:

in an idle to active state of the access terminal, allocating a fourth carrier frequency to the access terminal for use by the access terminal in the active operational state of the access terminal.

18. The method of claim 17, wherein the configuring, the directing, and the allocating are performed by a macro controller via the macro access point.

19. The method of claim 17, wherein the configuring, the directing, and the allocating are performed by the macro access point.

20. The method of claim 17, wherein the fourth carrier frequency comprises one of the shared carrier frequency, the first carrier frequency, or the second carrier frequency.

21. The method of claim 17, wherein the allocating comprises:

allocating the fourth carrier frequency to the access terminal based on a carrier frequency allocation algorithm.

22. The method of claim 21, wherein the carrier frequency allocation algorithm is based on the carrier frequency utilization of a set of access terminals communicating with the macro access point at corresponding carrier frequencies of the N carrier frequencies.

23. The method of claim 21, further comprising:

if the fourth carrier frequency allocated to the access terminal comprises the shared carrier frequency, then;

analyzing a report sent by the access terminal on the shared carrier frequency;

wherein the report comprises measurements of one or more signals received by the access terminal on the shared carrier frequency; and directing the access terminal to move to the first carrier frequency other than the shared carrier frequency if the report indicates that the access terminal is likely to be within range of the private access point.

24. The method of claim 17, wherein the allocating comprises:

receiving a request for a traffic channel from the access terminal on the shared carrier frequency; and allocating the fourth carrier frequency to the access terminal based on the request;

wherein the fourth carrier frequency comprises the shared carrier frequency.

25. The method of claim 17, wherein the allocating comprises:

allocating the fourth carrier frequency to the access terminal according to an idling carrier frequency used by the access terminal in the idle operational state of the access terminal.

26. The method of claim 17, further comprising:

receiving one or more reports from the access terminal;

wherein the access terminal is operating on a fifth carrier frequency other than the shared carrier frequency in the idle operational state;

wherein the fifth carrier frequency is a dedicated macro frequency and the private access point does not use the fifth carrier frequency; and determining whether to allocate the shared carrier frequency to the access terminal based on at least one report of the one or more reports received from the access terminal.

27. The method of claim 26, wherein the shared carrier frequency is allocated to the access terminal if the at least one report of the one or more reports received from the access terminal indicates that the access terminal is unlikely to be within range of the private access point.

28. The method of claim 26, wherein the one or more reports comprise a first report sent by the access terminal on the shared carrier frequency;

wherein the first report comprises measurements of one or more signals received by the access terminal on the shared carrier frequency.

29. The method of claim 28, further comprising:

requesting that the access terminal send the first report.

30. The method of claim 26, wherein the one or more reports comprise a second report sent by the access terminal on the fifth carrier frequency;

wherein the second report comprises measurements of one or more signals received by the access terminal on the fifth carrier frequency.

31. The method of claim 26, wherein the one or more reports further comprise additional reports sent by the access terminal;

wherein the additional reports comprise measurements of one or more signals received by the access terminal on one or more carrier frequencies of the N frequencies other than the shared carrier frequency and the fifth carrier frequency; and wherein the private access point does not use the one or more carrier frequencies.

32. The method of claim 31, further comprising:

requesting that the access terminal send the additional reports.

33. The method of claim 32, wherein requesting that the access terminal send the additional reports comprises:

analyzing the first report;

requesting that the access terminal send the additional reports responsively to analysis of the first report.

34. The method of claim 1, further comprising:

determining whether the access terminal is within range of the private access point in the active operational state of the access terminal;

wherein the directing is performed if the access terminal is determined to be within range of the private access point; and wherein the private access point does not use the first carrier frequency.

35. The method of claim 1, further comprising:

receiving one or more reports from the access terminal;

wherein the access terminal is operating on the shared carrier frequency in the active operational state;

wherein the directing is performed based on at least one report of the one or more reports received from the access terminal.

36. The method of claim 35, wherein the directing is performed if the at least one report of the one or more reports received from the access terminal indicates that the access terminal is likely to be within range of the private access point.

37. The method of claim 35, wherein the one or more reports comprise a first report sent by the access terminal on the shared carrier frequency; and wherein the first report comprises measurements of one or more signals received by the access terminal on the shared carrier frequency.

38. The method of claim 37, further comprising:

analyzing the first report;

wherein the directing is performed based on the first report only, without knowledge of signal measurements on carrier frequencies of the N frequencies other than the shared carrier frequency.

39. The method of claim 38, wherein the first carrier frequency is known to a macro controller to be a dedicated macro carrier frequency;

wherein the private access point does not use the first carrier frequency.

40. The method of claim 37, wherein the one or more reports further comprise additional reports sent by the access terminal;

wherein the additional reports comprise measurements of one or more signals received by the access terminal on one or more carrier frequencies of the N frequencies other than the shared carrier frequency; and wherein the private access point does not use the one or more carrier frequencies.

41. The method of claim 40, wherein the access terminal is configured to send the additional reports independently of being requested to do so.

42. The method of claim 41, wherein the access terminal is configured to compare measurements of received signals on the shared carrier frequency to one or more thresholds and to send the additional reports based a result of the comparison.

43. The method of claim 40, further comprising:

requesting that the access terminal send the additional reports.

44. The method of claim 43, wherein requesting that the access terminal send the additional reports comprises:

analyzing the first report; and requesting that the access terminal send the additional reports responsively to analysis of the first report.

45. The method of claim 43, wherein requesting that the access terminal send the additional reports comprises:

periodically requesting that the access terminal send the additional reports.

46. A computer program product tangibly embodied in one or more information carriers for mitigating interference between a private access point and an access terminal in a radio access network, the private access point using a shared carrier frequency that is shared with a macro access point, the access terminal having an idle operational state and an active operational state, the computer program product comprising instructions that are executable by one or more processing devices to:

direct the access terminal to move to a first carrier frequency other than the shared carrier frequency if the access terminal operates on the shared carrier frequency in the active operational state;

wherein the access terminal is configured to communicate with the macro access point and the access terminal is not authorized to communicate with the private access point;

wherein N carrier frequencies are used by the macro access point; and wherein N≧2.

47. The computer program product of claim 46, further comprising instructions that are executable by the one or more processing devices to:

configure a first carrier list for broadcast on a second carrier frequency other than the shared carrier frequency by the macro access point to the access terminal in the idle operational state of the access terminal.

48. The computer program product of claim 47, wherein the first carrier list does not include the shared carrier frequency.

49. The computer program product of claim 47, wherein configuring the first carrier list for broadcast by the macro access point to the access terminal in the idle operational state of the access terminal comprises:

configuring a set of N carrier lists for broadcast by the macro access point;

wherein each particular carrier list of the set of N carrier lists is broadcast by the macro access point on a corresponding particular different carrier frequency of the N carrier frequencies used by the macro access point;

wherein the N carrier frequencies comprise the shared carrier frequency and the first carrier frequency; and wherein the set of N carrier lists comprises the first carrier list and a second carrier list that is broadcast by the macro access point on the shared carrier frequency.

50. The computer program product of claim 49, wherein the access terminal is configured to select an idling carrier frequency from a received carrier list of the set of N carrier lists based on an algorithm;

wherein the access terminal receives the received carrier list from the macro access point;

wherein the access terminal is configured to idle on the idling carrier frequency in the idle operational state of the access terminal.

51. The computer program product of claim 49, wherein all carrier lists of the set of N carrier lists comprise no more than N−1 carrier list elements; wherein the N−1 carrier list elements correspond to certain carrier frequencies of the N carrier frequencies; and wherein all carrier lists of the set of N carrier lists do not include the shared carrier frequency as one of the N−1 carrier list elements.

52. The computer program product of claim 49, wherein all carrier lists of the set of N carrier lists comprise N carrier list elements; wherein the N carrier list elements correspond to certain carrier frequencies of the N carrier frequencies;

wherein different carrier lists of the set of N carrier lists are permitted to have different elements from one another; and wherein the second carrier list comprises the shared carrier frequency as one of the N carrier list elements.

53. The computer program product of claim 52, wherein configuring the set of N carrier lists for broadcast by the macro access point comprises:

removing the shared carrier frequency from the first carrier list; and replacing the shared carrier frequency in the first carrier list with the second carrier frequency on which the first carrier list is broadcast by the macro access point, so that the second carrier frequency appears at least two times in the first carrier list.

54. The computer program product of claim 53, wherein configuring the set of N carrier lists for broadcast by the macro access point further comprises:

removing the second carrier frequency from a third carrier list of the set of N carrier lists;

removing the second carrier frequency from the second carrier list; and replacing the second carrier frequency in the third carrier list and the second carrier list with the shared carrier frequency, so that the shared carrier frequency appears at least two times in the third carrier list and the second carrier list.

55. The computer program product of claim 53, wherein the private access point is configured to direct the access terminal to move to the second carrier frequency if the private access point determines that the access terminal is within range of the private access point on the shared carrier frequency in the idle operational state of the access terminal.

56. The computer program product of claim 55, wherein the private access point is configured to direct the access terminal to move to the second carrier frequency based on the replacement of the shared carrier frequency in the first carrier list with the second carrier frequency.

57. The computer program product of claim 55, further comprising instructions that are executable by the one or more processing devices to:
send a paging message to the access terminal based on a registration message received from the access terminal;
wherein the access terminal is configured to send the registration message to the macro access point in response to the access terminal being directed by the private access point to move to the second carrier frequency.

58. The computer program product of claim 55, further comprising instructions that are executable by the one or more processing devices to:
send a paging message to the access terminal on at least the shared carrier frequency and the second carrier frequency of the N carrier frequencies.

59. The computer program product of claim 53, further comprising instructions that are executable by the one or more processing devices to:
configure a roaming list for a set of access terminals;
wherein the set of access terminals comprises the access terminal; and
assign the second carrier frequency a reduced priority in the roaming list so that the set of access terminals is less likely to receive the first carrier list from the macro access point.

60. The computer program product of claim 53, further comprising instructions that are executable by the one or more processing devices to:
configure an additional carrier list for broadcast by the macro access point so that a set of N+1 carrier lists is configured for broadcast by the macro access point;
wherein the set of N+1 carrier lists comprises the set of N carrier lists;
wherein all carrier lists of the set of N+1 carrier lists comprise N+1 carrier list elements;
wherein a second shared carrier frequency is an additional frequency used by the macro access point so that N+1 carrier frequencies are used by the macro access point;
wherein the N+1 carrier frequencies comprise the N carrier frequencies;
remove the second shared carrier frequency from the first carrier list;
wherein a second private access point and the macro access point both use the second shared carrier frequency; and
replace the second shared carrier frequency in the first carrier list with the second carrier frequency on which the first carrier list is broadcast by the macro access point, so that the second carrier frequency appears at least three times in the first carrier list.

61. The computer program product of claim 53, further comprising instructions that are executable by the one or more processing devices to:
configure an additional carrier list for broadcast by the macro access point so that a set of N+1 carrier lists is configured for broadcast by the macro access point;
wherein the set of N+1 carrier lists comprises the set of N carrier lists;
wherein all carrier lists of the set of N+1 carrier lists comprise N+1 carrier list elements;
wherein a second shared carrier frequency is an additional frequency used by the macro access point so that N+1 carrier frequencies are used by the macro access point;
wherein the N+1 carrier frequencies comprise the N carrier frequencies;
remove the second shared carrier frequency from a third carrier list of the set of N+1 carrier lists;
wherein a second private access point and the macro access point both use the second shared carrier frequency; and
replace the second shared carrier frequency in the third carrier list with a third carrier frequency on which the third carrier list is broadcast by the macro access point, so that the second carrier frequency appears at least two times in the third carrier list.

62. The computer program product of claim 47, further comprising instructions that are executable by the one or more processing devices to:
in an idle to active state of the access terminal,
allocate a fourth carrier frequency to the access terminal for use by the access terminal in the active operational state of the access terminal.

63. The computer program product of claim 62, wherein the configuring, the directing, and the allocating are performed by a macro controller via the macro access point.

64. The computer program product of claim 62, wherein the configuring, the directing, and the allocating are performed by the macro access point.

65. The computer program product of claim 62, wherein the fourth carrier frequency comprises one of the shared carrier frequency, the first carrier frequency, or the second carrier frequency.

66. The computer program product of claim 62, wherein the allocating comprises:
allocating the fourth carrier frequency to the access terminal based on a carrier frequency allocation algorithm.

67. The computer program product of claim 66, wherein the carrier frequency allocation algorithm is based on the carrier frequency utilization of a set of access terminals communicating with the macro access point at corresponding carrier frequencies of the N carrier frequencies.

68. The computer program product of claim 66, further comprising instructions that are executable by the one or more processing devices to:
if the fourth carrier frequency allocated to the access terminal comprises the shared carrier frequency, then;
analyze a report sent by the access terminal on the shared carrier frequency;
wherein the report comprises measurements of one or more signals received by the access terminal on the shared carrier frequency; and
direct the access terminal to move to the first carrier frequency other than the shared carrier frequency if the report indicates that the access terminal is likely to be within range of the private access point.

69. The computer program product of claim 62, wherein the allocating comprises:

receiving a request for a traffic channel from the access terminal on the shared carrier frequency; and allocating the fourth carrier frequency to the access terminal based on the request;

wherein the fourth carrier frequency comprises the shared carrier frequency.

70. The computer program product of claim 62, wherein the allocating comprises:

allocating the fourth carrier frequency to the access terminal according to an idling carrier frequency used by the access terminal in the idle operational state of the access terminal.

71. The computer program product of claim 62, further comprising instructions that are executable by the one or more processing devices to:

receive one or more reports from the access terminal;

wherein the access terminal is operating on a fifth carrier frequency other than the shared carrier frequency in the idle operational state;

wherein the fifth carrier frequency is a dedicated macro frequency and the private access point does not use the fifth carrier frequency; and determine whether to allocate the shared carrier frequency to the access terminal based on at least one report of the one or more reports received from the access terminal.

72. The computer program product of claim 71, wherein the shared carrier frequency is allocated to the access terminal if the at least one report of the one or more reports received from the access terminal indicates that the access terminal is unlikely to be within range of the private access point.

73. The computer program product of claim 71, wherein the one or more reports comprise a first report sent by the access terminal on the shared carrier frequency;

wherein the first report comprises measurements of one or more signals received by the access terminal on the shared carrier frequency.

74. The computer program product of claim 73, further comprising instructions that are executable by the one or more processing devices to:

request that the access terminal send the first report.

75. The computer program product of claim 71, wherein the one or more reports comprise a second report sent by the access terminal on the fifth carrier frequency;

wherein the second report comprises measurements of one or more signals received by the access terminal on the fifth carrier frequency.

76. The computer program product of claim 71, wherein the one or more reports further comprise additional reports sent by the access terminal;

wherein the additional reports comprise measurements of one or more signals received by the access terminal on one or more carrier frequencies of the N frequencies other than the shared carrier frequency and the fifth carrier frequency; and wherein the private access point does not use the one or more carrier frequencies.

77. The computer program product of claim 76, further comprising instructions that are executable by the one or more processing devices to:

request that the access terminal send the additional reports.

78. The computer program product of claim 77, wherein requesting that the access terminal send the additional reports comprises:

analyzing the first report;

requesting that the access terminal send the additional reports responsively to analysis of the first report.

79. The computer program product of claim 46, further comprising instructions that are executable by the one or more processing devices to:

determine whether the access terminal is within range of the private access point in the active operational state of the access terminal;

wherein the directing is performed if the access terminal is determined to be within range of the private access point; and wherein the private access point does not use the first carrier frequency.

80. The computer program product of claim 46, further comprising instructions that are executable by the one or more processing devices to:

receive one or more reports from the access terminal;

wherein the access terminal is operating on the shared carrier frequency in the active operational state;

wherein the directing is performed based on at least one report of the one or more reports received from the access terminal.

81. The computer program product of claim 80, wherein the directing is performed if the at least one report of the one or more reports received from the access terminal indicates that the access terminal is likely to be within range of the private access point.

82. The computer program product of claim 80, wherein the one or more reports comprise a first report sent by the access terminal on the shared carrier frequency; and wherein the first report comprises measurements of one or more signals received by the access terminal on the shared carrier frequency.

83. The computer program product of claim 82, further comprising instructions that are executable by the one or more processing devices to:

analyze the first report;

wherein the directing is performed based on the first report only, without knowledge of signal measurements on carrier frequencies of the N frequencies other than the shared carrier frequency.

84. The computer program product of claim 83, wherein the first carrier frequency is known to a macro controller to be a dedicated macro carrier frequency;

wherein the private access point does not use the first carrier frequency.

85. The computer program product of claim 82, wherein the one or more reports further comprise additional reports sent by the access terminal;

wherein the additional reports comprise measurements of one or more signals received by the access terminal on one or more carrier frequencies of the N frequencies other than the shared carrier frequency; and wherein the private access point does not use the one or more carrier frequencies.

86. The computer program product of claim 85, wherein the access terminal is configured to send the additional reports independently of being requested to do so.

87. The computer program product of claim 86, wherein the access terminal is configured to compare measurements of received signals on the shared carrier frequency to one or more thresholds and to send the additional reports based a result of the comparison.

88. The computer program product of claim 85, further comprising instructions that are executable by the one or more processing devices to:

request that the access terminal send the additional reports.

89. The computer program product of claim 88, wherein requesting that the access terminal send the additional reports comprises:
   analyzing the first report; and
   requesting that the access terminal send the additional reports responsively to analysis of the first report.

90. The computer program product of claim 88, wherein requesting that the access terminal send the additional reports comprises:
   periodically requesting that the access terminal send the additional reports.

91. A system for mitigating interference between a private access point and an access terminal in a radio access network, the private access point using a shared carrier frequency that is shared with a macro access point, the access terminal having an idle operational state and an active operational state, the system comprising:
   a macro controller comprising:
      memory configured to store instructions for execution; and
      one or more processing devices configured to execute the instructions, the instructions for causing the one or more processing devices to:
         direct the access terminal to move to a first carrier frequency other than the shared carrier frequency if the access terminal operates on the shared carrier frequency in the active operational state;
         wherein the access terminal is configured to communicate with the macro access point and the access terminal is not authorized to communicate with the private access point;
         wherein N carrier frequencies are used by the macro access point; and
         wherein N≧2.

92. The system of claim 91, wherein the instructions for execution further comprise instructions for causing the one or more processing devices to:
   configure a first carrier list for broadcast on a second carrier frequency other than the shared carrier frequency by the macro access point to the access terminal in the idle operational state of the access terminal.

93. The system of claim 92, wherein the first carrier list does not include the shared carrier frequency.

94. The system of claim 92, wherein configuring the first carrier list for broadcast by the macro access point to the access terminal in the idle operational state of the access terminal comprises:
   configuring a set of N carrier lists for broadcast by the macro access point;
   wherein each particular carrier list of the set of N carrier lists is broadcast by the macro access point on a corresponding particular different carrier frequency of the N carrier frequencies used by the macro access point;
   wherein the N carrier frequencies comprise the shared carrier frequency and the first carrier frequency; and
   wherein the set of N carrier lists comprises the first carrier list and a second carrier list that is broadcast by the macro access point on the shared carrier frequency.

95. The system of claim 94, wherein the access terminal is configured to select an idling carrier frequency from a received carrier list of the set of N carrier lists based on an algorithm;
   wherein the access terminal receives the received carrier list from the macro access point;
   wherein the access terminal is configured to idle on the idling carrier frequency in the idle operational state of the access terminal.

96. The system of claim 94, wherein all carrier lists of the set of N carrier lists comprise no more than N−1 carrier list elements; wherein the N−1 carrier list elements correspond to certain carrier frequencies of the N carrier frequencies; and
   wherein all carrier lists of the set of N carrier lists do not include the shared carrier frequency as one of the N−1 carrier list elements.

97. The system of claim 94, wherein all carrier lists of the set of N carrier lists comprise N carrier list elements; wherein the N carrier list elements correspond to certain carrier frequencies of the N carrier frequencies;
   wherein different carrier lists of the set of N carrier lists are permitted to have different elements from one another; and
   wherein the second carrier list comprises the shared carrier frequency as one of the N carrier list elements.

98. The system of claim 97, wherein configuring the set of N carrier lists for broadcast by the macro access point comprises:
   removing the shared carrier frequency from the first carrier list; and
   replacing the shared carrier frequency in the first carrier list with the second carrier frequency on which the first carrier list is broadcast by the macro access point, so that the second carrier frequency appears at least two times in the first carrier list.

99. The system of claim 98, wherein configuring the set of N carrier lists for broadcast by the macro access point further comprises:
   removing the second carrier frequency from a third carrier list of the set of N carrier lists;
   removing the second carrier frequency from the second carrier list; and
   replacing the second carrier frequency in the third carrier list and the second carrier list with the shared carrier frequency, so that the shared carrier frequency appears at least two times in the third carrier list and the second carrier list.

100. The system of claim 98, wherein the private access point is configured to direct the access terminal to move to the second carrier frequency if the private access point determines that the access terminal is within range of the private access point on the shared carrier frequency in the idle operational state of the access terminal.

101. The system of claim 100, wherein the private access point is configured to direct the access terminal to move to the second carrier frequency based on the replacement of the shared carrier frequency in the first carrier list with the second carrier frequency.

102. The system of claim 101, further comprising:
   the private access point.

103. The system of claim 100, wherein the instructions for execution further comprise instructions for causing the one or more processing devices to:
   send a paging message to the access terminal based on a registration message received from the access terminal;
   wherein the access terminal is configured to send the registration message to the macro access point in response to the access terminal being directed by the private access point to move to the second carrier frequency.

104. The system of claim 100, wherein the instructions for execution further comprise instructions for causing the one or more processing devices to:
   send a paging message to the access terminal on at least the shared carrier frequency and the second carrier frequency of the N carrier frequencies.

105. The system of claim 98, wherein the instructions for execution further comprise instructions for causing the one or more processing devices to:
- configure a roaming list for a set of access terminals;
- wherein the set of access terminals comprises the access terminal; and
- assign the second carrier frequency a reduced priority in the roaming list so that the set of access terminals is less likely to receive the first carrier list from the macro access point.

106. The system of claim 98, wherein the instructions for execution further comprise instructions for causing the one or more processing devices to:
- configure an additional carrier list for broadcast by the macro access point so that a set of N+1 carrier lists is configured for broadcast by the macro access point;
- wherein the set of N+1 carrier lists comprises the set of N carrier lists;
- wherein all carrier lists of the set of N+1 carrier lists comprise N+1 carrier list elements;
- wherein a second shared carrier frequency is an additional frequency used by the macro access point so that N+1 carrier frequencies are used by the macro access point;
- wherein the N+1 carrier frequencies comprise the N carrier frequencies;
- remove the second shared carrier frequency from the first carrier list;
- wherein a second private access point and the macro access point both use the second shared carrier frequency; and
- replace the second shared carrier frequency in the first carrier list with the second carrier frequency on which the first carrier list is broadcast by the macro access point, so that the second carrier frequency appears at least three times in the first carrier list.

107. The system of claim 98, wherein the instructions for execution further comprise instructions for causing the one or more processing devices to:
- configure an additional carrier list for broadcast by the macro access point so that a set of N+1 carrier lists is configured for broadcast by the macro access point;
- wherein the set of N+1 carrier lists comprises the set of N carrier lists;
- wherein all carrier lists of the set of N+1 carrier lists comprise N+1 carrier list elements;
- wherein a second shared carrier frequency is an additional frequency used by the macro access point so that N+1 carrier frequencies are used by the macro access point;
- wherein the N+1 carrier frequencies comprise the N carrier frequencies;
- remove the second shared carrier frequency from a third carrier list of the set of N+1 carrier lists;
- wherein a second private access point and the macro access point both use the second shared carrier frequency; and
- replace the second shared carrier frequency in the third carrier list with a third carrier frequency on which the third carrier list is broadcast by the macro access point, so that the second carrier frequency appears at least two times in the third carrier list.

108. The system of claim 92, wherein the instructions for execution further comprise instructions for causing the one or more processing devices to:
- in an idle to active state of the access terminal,
  - allocate a fourth carrier frequency to the access terminal for use by the access terminal in the active operational state of the access terminal.

109. The system of claim 108, wherein the fourth carrier frequency comprises one of the shared carrier frequency, the first carrier frequency, or the second carrier frequency.

110. The system of claim 108, wherein the allocating comprises:
- allocating the fourth carrier frequency to the access terminal based on a carrier frequency allocation algorithm.

111. The system of claim 110, wherein the carrier frequency allocation algorithm is based on the carrier frequency utilization of a set of access terminals communicating with the macro access point at corresponding carrier frequencies of the N carrier frequencies.

112. The system of claim 110, wherein the instructions for execution further comprise instructions for causing the one or more processing devices to:
- if the fourth carrier frequency allocated to the access terminal comprises the shared carrier frequency, then;
  - analyze a report sent by the access terminal on the shared carrier frequency;
  - wherein the report comprises measurements of one or more signals received by the access terminal on the shared carrier frequency; and
  - direct the access terminal to move to the first carrier frequency other than the shared carrier frequency if the report indicates that the access terminal is likely to be within range of the private access point.

113. The system of claim 108, wherein the allocating comprises:
- receiving a request for a traffic channel from the access terminal on the shared carrier frequency; and
- allocating the fourth carrier frequency to the access terminal based on the request;
- wherein the fourth carrier frequency comprises the shared carrier frequency.

114. The system of claim 108, wherein the allocating comprises:
- allocating the fourth carrier frequency to the access terminal according to an idling carrier frequency used by the access terminal in the idle operational state of the access terminal.

115. The system of claim 108, wherein the instructions for execution further comprise instructions for causing the one or more processing devices to:
- receive one or more reports from the access terminal;
- wherein the access terminal is operating on a fifth carrier frequency other than the shared carrier frequency in the idle operational state;
- wherein the fifth carrier frequency is a dedicated macro frequency and the private access point does not use the fifth carrier frequency; and
- determine whether to allocate the shared carrier frequency to the access terminal based on at least one report of the one or more reports received from the access terminal.

116. The system of claim 115, wherein the shared carrier frequency is allocated to the access terminal if the at least one report of the one or more reports received from the access terminal indicates that the access terminal is unlikely to be within range of the private access point.

117. The system of claim 115, wherein the one or more reports comprise a first report sent by the access terminal on the shared carrier frequency;
- wherein the first report comprises measurements of one or more signals received by the access terminal on the shared carrier frequency.

118. The system of claim 117, wherein the instructions for execution further comprise instructions for causing the one or more processing devices to:
request that the access terminal send the first report.

119. The system of claim 115, wherein the one or more reports comprise a second report sent by the access terminal on the fifth carrier frequency;
wherein the second report comprises measurements of one or more signals received by the access terminal on the fifth carrier frequency.

120. The system of claim 115, wherein the one or more reports further comprise additional reports sent by the access terminal;
wherein the additional reports comprise measurements of one or more signals received by the access terminal on one or more carrier frequencies of the N frequencies other than the shared carrier frequency and the fifth carrier frequency; and
wherein the private access point does not use the one or more carrier frequencies.

121. The system of claim 120, wherein the instructions for execution further comprise instructions for causing the one or more processing devices to:
request that the access terminal send the additional reports.

122. The system of claim 121, wherein requesting that the access terminal send the additional reports comprises:
analyzing the first report;
requesting that the access terminal send the additional reports responsively to analysis of the first report.

123. The system of claim 91, wherein the instructions for execution further comprise instructions for causing the one or more processing devices to:
determine whether the access terminal is within range of the private access point in the active operational state of the access terminal;
wherein the directing is performed if the access terminal is determined to be within range of the private access point; and
wherein the private access point does not use the first carrier frequency.

124. The system of claim 91, wherein the instructions for execution further comprise instructions for causing the one or more processing devices to:
receive one or more reports from the access terminal;
wherein the access terminal is operating on the shared carrier frequency in the active operational state;
wherein the directing is performed based on at least one report of the one or more reports received from the access terminal.

125. The system of claim 124, wherein the directing is performed if the at least one report of the one or more reports received from the access terminal indicates that the access terminal is likely to be within range of the private access point.

126. The system of claim 124, wherein the one or more reports comprise a first report sent by the access terminal on the shared carrier frequency; and
wherein the first report comprises measurements of one or more signals received by the access terminal on the shared carrier frequency.

127. The system of claim 126, wherein the instructions for execution further comprise instructions for causing the one or more processing devices to:
analyze the first report;
wherein the directing is performed based on the first report only, without knowledge of signal measurements on carrier frequencies of the N frequencies other than the shared carrier frequency.

128. The system of claim 127, wherein the first carrier frequency is known to the macro controller to be a dedicated macro carrier frequency;
wherein the private access point does not use the first carrier frequency.

129. The system of claim 126, wherein the one or more reports further comprise additional reports sent by the access terminal;
wherein the additional reports comprise measurements of one or more signals received by the access terminal on one or more carrier frequencies of the N frequencies other than the shared carrier frequency; and
wherein the private access point does not use the one or more carrier frequencies.

130. The system of claim 129, wherein the access terminal is configured to send the additional reports independently of being requested to do so.

131. The system of claim 130, wherein the access terminal is configured to compare measurements of received signals on the shared carrier frequency to one or more thresholds and to send the additional reports based a result of the comparison.

132. The system of claim 129, wherein the instructions for execution further comprise instructions for causing the one or more processing devices to:
request that the access terminal send the additional reports.

133. The system of claim 132, wherein requesting that the access terminal send the additional reports comprises:
analyzing the first report; and
requesting that the access terminal send the additional reports responsively to analysis of the first report.

134. The system of claim 132, wherein requesting that the access terminal send the additional reports comprises:
periodically requesting that the access terminal send the additional reports.

135. The system of claim 91, wherein the macro access point comprises the macro controller.

136. The system of claim 91, wherein the macro access point is configured to communicate with the macro controller over a backhaul connection.

* * * * *